United States Patent [19]
Usui et al.

[11] Patent Number: 5,444,033
[45] Date of Patent: Aug. 22, 1995

[54] CATALYST COMPOSITIONS FOR HYDROTREATING OF HYDROCARBON OILS AND PROCESS FOR MANUFACTURING THE SAME.

[75] Inventors: Kazushi Usui, Noda; Shigenori Nakashizu, Souka; Kentarou Ishida, Satte, all of Japan

[73] Assignees: Cosmo Research Institute, Saitama; Cosmo Oil Co., Ltd., Tokyo, both of Japan

[21] Appl. No.: 254,424

[22] Filed: Jun. 6, 1994

Related U.S. Application Data

[63] Continuation of Ser. No. 955,252, Oct. 1, 1992, abandoned.

[30] Foreign Application Priority Data

Oct. 18, 1991 [JP] Japan .................. 3-299742
Oct. 18, 1991 [JP] Japan .................. 3-299743
Nov. 1, 1991 [JP] Japan .................. 3-315402

[51] Int. Cl.⁶ .................. B01J 21/02; B01J 23/00
[52] U.S. Cl. .................. 502/314; 502/204; 502/313; 502/315
[58] Field of Search .................. 502/204, 313, 314, 315

[56] References Cited

U.S. PATENT DOCUMENTS 4,495,308  1/1985  Gibson .................. 502/314 X
4,760,045  7/1988  Oishi et al. .................. 502/321
4,861,746  8/1989  Oishi et al. .................. 502/314

*Primary Examiner*—Asok Pal
*Assistant Examiner*—E. D. Irzinski
*Attorney, Agent, or Firm*—Oliff & Berridge

[57] ABSTRACT

A catalyst composition for hydrotreating of hydrocarbon oils is disclosed. The composition comprises a Group VIB metal in an amount of 5–30% by weight, as oxide, and a Group VIII metal in an amount of 1–10% by weight, as oxide, wherein said Group VIB metal and said Group VIII metal are distributed with a concentration gradient which becomes higher from the surface toward the center of a catalyst particle according to the formulas, $0.9 > h_2/h_1 \geq 0$, wherein $h_1$ is the Group VIB metal concentration at the center of the catalyst particle and $h_2$ at the outermost surface of the catalyst particle, and $0.9 > h_4/h_3 \geq 0$, wherein $h_3$ is the Group VIII metal concentration at the center of the catalyst particle and $h_4$ at the outermost surface of the catalyst particle. The catalyst composition can be used for hydrodesulfurization, hydrodenitrification, hydrodemetalization, and hydrocracking of topping or vacuum distillates and residues, as well as hydrotreatments for the refining of such fractions as kerosene, gas oil, wax, and lubricating oil. It exhibits a high activity for a prolonged period of time. Processes for manufacturing the catalyst composition are also disclosed.

23 Claims, 28 Drawing Sheets

CATALYST COMPOSITIONS FOR HYDROTREATING OF HYDROCARBON OILS AND PROCESS FOR MANUFACTURING THE SAME.

This is a Continuation application Ser. No. 07/955,252 filed Oct. 1, 1992, now abandoned.

BACKGROUND OF THE INVENTION

1. Field of the Invention

The present invention relates to a catalyst composition and a process for manufacturing the same. More particularly, the present invention relates to a catalyst composition for hydrotreating of hydrocarbon oils which comprises a micropore alumina or a micropore alumina-containing carrier which comprises an active metal belonging to Group VIB of the Periodic Table and an active metal belonging to Group VIII of the Periodic Table, wherein said active metals are supported by said alumina or alumina-containing carrier at a higher concentration in the center than on the outermost surface of the catalyst particle, and to a process for manufacturing such a catalyst composition. The catalyst composition exhibits a high activity for a prolonged period of time.

2. Description of the Background Art

Topping residue, vacuum gas oil, and vacuum residue obtained by topping distillation or vacuum distillation of crude oils contain large amounts of sulfur compounds and metals. Their contents vary depending on types of crude oils. Burning of these heavy hydrocarbon oils involves generation of toxic substances such as sulfur oxides ($SO_x$) and the like, which are the causes of furnace corrosion and air pollution. When heavy hydrocarbon oils are catalytically treated to be cracked into lighter fractions, sulfur compounds, nitrogen compounds, and metals act so as to deactivate catalysts. This is a serious cause which prevents effective utilization of heavy hydrocarbon oils. In order to overcome this problem by removing metals and sulfur in the sulfur compounds, heavy hydrocarbon oils containing large amounts of sulfur compounds and metals are treated under hydrogen pressure with a catalyst comprising a Group VIB metal, e.g., molybdenum, chromium, tungsten, or Group VIII metal, e.g. iron, cobalt, nickel, platinum, supported on alumina or an alumina-containing carrier.

Such a treatment, however, does not give a satisfactory result. In particular, the catalyst activity seriously deteriorates due to deposition of metals contained in hydrocarbon oils and carbonaceous materials, i.e., decomposition products of hydrocarbon oils, thus significantly lowering the catalyst activity and unduly reducing the desulfurization rate. Development of a catalyst composition for the hydrotreatment of hydrocarbon oils, of which the activity is not inhibited by carbonaceous materials and metals, especially by metals, has therefore been desired.

The present invention therefore provides a novel catalyst composition for hydrotreating of hydrocarbon oils which is poisoned only with difficulty by metals contained in hydrocarbon oils and maintains its desulfurization activity for a prolonged period of time, as well as a process for manufacturing such a catalyst composition.

SUMMARY OF THE INVENTION

With an intention to solve the above problems, the present inventors analyzed catalyst compositions for hydrotreating of hydrocarbon oils which had been served for operation for about 1 year, and found that vanadium and nickel, which are major metals contained in hydrocarbon oils and accumulated in the catalyst compositions, were the cause of their deactivation. The present inventors further found that especially vanadium, which poisons catalytically active metals, accumulated on the surface of catalyst particles and its concentration was decreased toward the center of the catalyst particles. As a result of further extensive studies, the present inventors have found that a catalyst composition in which an active metal belonging to Group VIB of the Periodic Table and an active metal belonging to Group VIII of the Periodic Table are contained at a higher concentration in the center of catalyst particles than on their surface, as opposed to the vanadium concentrations in the catalyst particles, can maintain its desulfurization activity for a longer period of time than conventional catalyst compositions in which an active metal is evenly distributed from the center toward the surface of catalyst particles.

Furthermore, the present inventors have found that the above catalyst composition in which a Group VIB metal and an active metal belonging to Group VIII of the Periodic Table are distributed with a gradient in their concentration from the center through the surface of the catalyst particles can be industrially manufactured by using alumina containing silica, zeolite, boria, titania, or zinc oxide as a carrier and impregnating said metals into the carrier in an acidic aqueous solution having a specific pH value under specific conditions; or alternatively by using alumina containing boria, titania, or zinc oxide as a carrier and treating the carrier with an acidic aqueous solution having a specific pH value prior to impregnating said metals into the carrier.

These findings have led to the completion of the present invention.

Accordingly, an object of the present invention is to provide a catalyst composition for hydrotreating of hydrocarbon oils which comprises a Group VIB metal in an amount of 5-30% by weight, as oxide, and a Group VIII metal in an amount of 1-10% by weight, as oxide, wherein said Group VIB metal and said Group VIII metal are distributed with a concentration gradient which becomes higher from the surface toward the center of a catalyst particle according to the formulas $0.9 > h_2/h_1 \geq 0$, wherein $h_1$ is the Group VIB metal concentration at the center of the catalyst particle and $h_2$ at the outermost surface of the catalyst particle, and $0.9 > h_4/h_3 \geq 0$, wherein $h_3$ is the Group VIII metal concentration at the center of the catalyst particle and $h_4$ at the outermost surface of the catalyst particle (such a catalyst composition is herein referred to as the first invention).

Another object of the present invention is to provide a process for manufacturing said catalyst composition which comprises, providing an aqueous solution of pH 1–5.5 containing one or more Group VIB metals and an alumina carrier containing 5–40% by weight of at least one component selected from the group consisting of silica, zeolite, boria, titania, and zinc oxide, impregnating said one or more Group VIB metals into said alumina carrier by immersing said alumina carrier into said aqueous solution at a temperature from 45° C. to the boiling point of said aqueous solution for at least 60 minutes, and impregnating one or more Group VIII metals into said alumina carrier (this process is herein referred to as the second invention).

Still another object of the present invention is to provide a process for manufacturing said catalyst composition which comprises, immersing an alumina carrier containing 5-40% by weight of at least one component selected from the group consisting of boria, titania, and zinc oxide into an aqueous solution of pH 1-5.5 at a temperature from 45° C. to the boiling point of said aqueous solution for at least 60 minutes, and impregnating one or more Group VIB metals and one or more Group VIII metals into said alumina carrier (this process is herein referred to as the third invention).

Other objects, features and advantages of the invention will hereinafter become more readily apparent from the following description.

DETAILED DESCRIPTION OF THE INVENTION AND PREFERRED EMBODIMENTS

Figure 1:
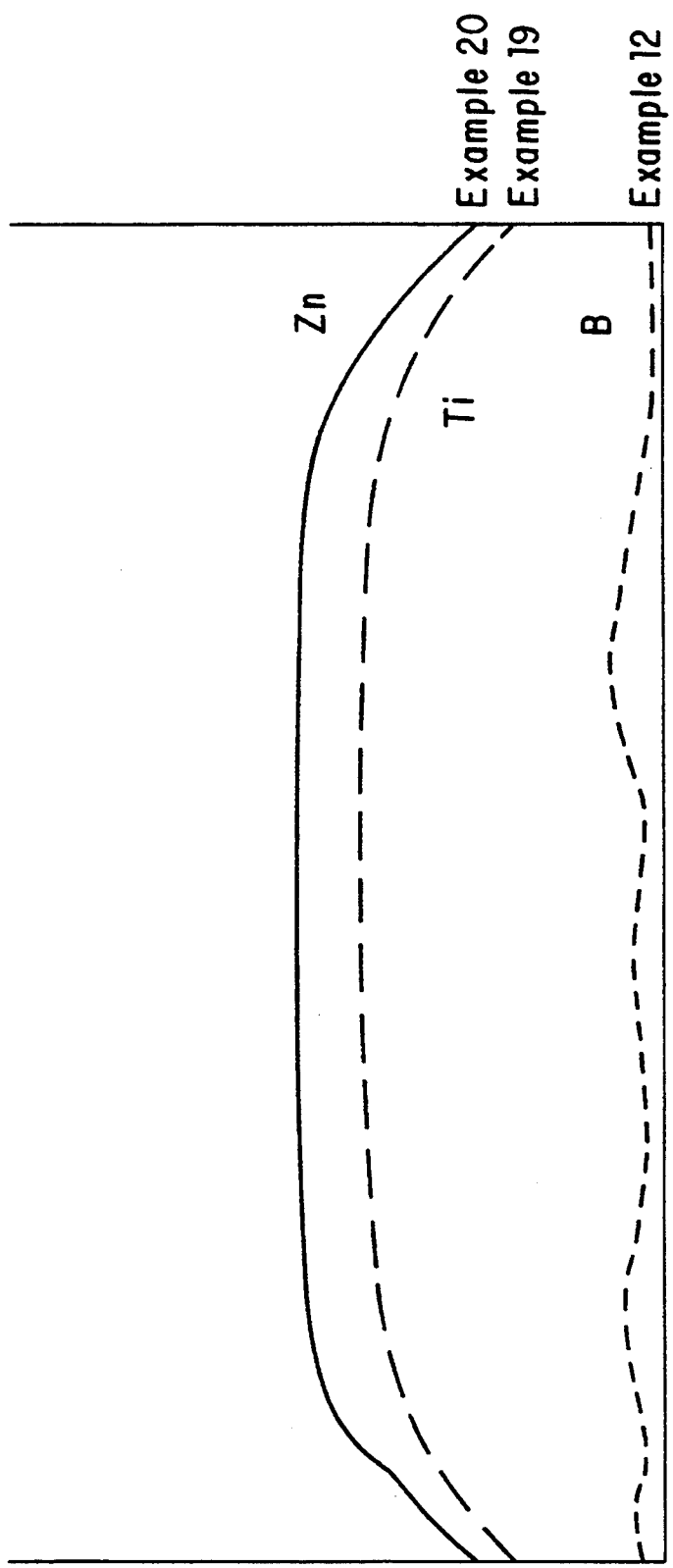
FIG. 1 shows distributions of boria, titania, and zinc oxide in the catalyst compositions obtained in Examples 12, 19, and 20, determined by the EPMA (electron probe microanalyzer) line analysis.

In the catalyst composition for hydrotreating of hydrocarbon oils of the present invention, a Group VIB metal and a Group VIII metal are distributed in the catalyst particle with a concentration gradient which becomes higher from the surface toward the center, as determined by an electron probe microanalyzer (hereinafter referred to as EPMA) along the straight line passing through the center of the cross sectional plane of the particle (the analysis for the determination is hereinafter referred to as "EPMA line analysis").

With respect to the Group VIB metal, the concentration gradient is such that $h_2/h_1$, i.e., the ratio of the metal content at the outermost surface of the catalyst particle ($h_2$) to that of the center ($h_1$), is 0 to about 0.9, and preferably 0 to about 0.76; and with respect to the Group VIII metal, the concentration gradient is such that $h_4/h_3$, i.e., the ratio of the metal content at the outermost surface of the catalyst particle ($h_4$) to that of the center ($h_3$), is 0 to about 0.9, and preferably 0 to about 0.71. In this formula, $h_4/h_3=0$, means that the Group VIII metal concentration is zero at the outermost surface, but increases toward the center of the particles.

A preferable total amount of the Group VIII metals contained in the catalyst composition is about 1-10% by weight as oxides, $M_xO_y$, wherein M is a Group VIII metal.

In the same way, in catalyst particles having the Group VIB metal content ratio of $h_2/h_1=0$, the metal concentration is zero at their outermost surface, but increases toward the center of the particles. A preferable total amount of Group VIB metals contained in the catalyst composition of the present invention is about 5-30% by weight as oxides, $XO_3$, wherein X is a Group VIB metal.

The inequality, $0.9 > h_2/h_1$, represents that the metal concentration at the center of the catalyst particle is about 1.1 times or more of the metal content at the outermost surface. A superior effect intended in the present invention cannot be obtained if the Group VIB metal concentration at the center of the catalyst particle is less than 1.1 times of the content at the outermost surface.

The catalyst composition prepared by the process of the present invention was analyzed by EPMA, JXA-8600MX (trademark, manufactured by Nippon Denshi Co., Ltd.), at an acceleration voltage of 20 KV and an acceleration current of 0.1 mA. In EPMA line analysis graphs the site in a catalyst particle was taken along the axis of abscissa and the number of atoms in a unit volume was taken along the axis of ordinate. Since each element has an individual value of the number of atoms, the comparison between different elements cannot be directly performed based on the graphs.

The concentration gradient of Group VIB metals supported by the catalyst along the straight line from the center to the outermost surface may take any form, including a straight line or a curve, such as parabola, hook, or the like, so long as the concentration distribution satisfies the above-mentioned inequality.

With respect to Group VIII metals in the catalyst composition of the present invention, in the same manner as in Group VIB metals, the metal concentration increases from the outermost surface toward the center of the particles.

The catalyst particles may take various shapes. Preferable shapes include, for example, cylinders, dumbbells with a pair of aligned small spheres, and configurations with three or four small spheres linked together like clover. The spheres are not necessarily an exactly round spheres; they may be oval or may be more alike to quadratic, cubic, tetragonal, or the like.

Shapes of cross sections may be hollow cylindrical or may be pillars with character-like configurations such as T, I, C, or E, or may be a hollow square. Cross sections may also be honeycombs with each comb being triangle, diagonal, pentagonal, hexagonal, octagonal, or the like. Of course, spherical particles are acceptable. Particle sizes are usually in the range of 0.5-20 mm, although there are no specific limitations.

Here, "cross section" of a catalyst particle is a section perpendicular to the longitudinal direction of the particle. "Center of a catalyst particle" denotes the symmetrical center of the cross section when the cross section is symmetrical, i.e., when it is a true circle, ellipse, rectangle, square, rhombus, etc.; or the midpoint of the line connecting the outermost two vis-a-vis points, when the cross section is a hollow cylinder or of a character-like configuration such as T, I, C, or E, or a hollow square.

The process for the manufacture of the catalyst composition according to the second invention basically comprises impregnating Group VIB metals into said carrier under specific conditions.

Any Group VIB metal compounds which can be made into an aqueous solution can be used in the present invention. Preferable compounds are compounds of Cr, Mo, or W, such as ammonium dichromate [$(NH_4)_2Cr_2O_7$], ammonium paramolybdate tetrahydrate [$(NH_4)_6Mo_7O_{24} \cdot 4H_2O$], tungstic acid ($H_2WO_4$), and the like. Especially preferred is ammonium paramolybdate tetrahydrate.

As catalyst carrier, alumina containing at least one of silica, zeolite, boria, titania, or zinc oxide in an amount of 5–40% by weight, based on the total weight of the catalyst composition, is used. Kneading, a coprecipitation method, or other method can be used for incorporating silica, zeolite, boria, titania, or zinc oxide into alumina. As alumina, Gamma-alumina, Chi-alumina, or Eta-alumina, or a mixture of these can be used.

Components other than silica, zeolite, boria, titania, and zinc oxide, such as refractory oxides, e.g., magnesia, calcium oxide, zirconia, hafnia, etc., can be incorporated into the carrier together with silica, zeolite, boria, titania, or zinc oxide.

As an aqueous solution of Group VIB metal compound, any aqueous solutions of inorganic acid, except for hydrofluoric acid solutions, such as aqueous solutions of nitric acid, hydrochloric acid, sulfuric acid, or the like, can be used. An especially preferable aqueous solution is a nitric acid solution. Hydrofluoric acid cannot be used, since it destroys the crystal structures of alumina. These acidic aqueous solution has a pH of 1–5.5, and preferably of 2–4. If the pH is smaller than 1, the acid may destroy the crystal structures of alumina; if greater than 5.5, a sufficient effect cannot be obtained.

Illustrating a preferred embodiment of the method of the preparation, an aqueous solution of ammonium paramolybdate with a Mo concentration of about 0.25 mol/l is first provided as an impregnating solution in an amount larger than the pore volume of an alumina carrier which contains silica, zeolite, boria, titania, or zinc oxide, e.g., an amount of 5–100 times, preferably 10–30 times, of the pore volume of the alumina-containing carrier (0.7–1.0 cc/g). Then, the carrier is immersed into said aqueous solution which is kept at 60° C. This solution is then adjusted to pH 2 with the addition of concentrated nitric acid or the like and allowed to stand for 24 hours. The solid material collected by filtration is promptly dried and calcined.

The temperature of the impregnation liquid is between about 45° C. and its boiling point. Accordingly, the temperature may be 100° C. or more, when the impregnation is performed in a pressure vessel. However, a temperature below 100° C. under atmospheric pressure is generally sufficient, with a preferred temperature range being 50°–80° C. The time for which the carrier is impregnated is about 60 minutes or longer, preferably 80 minutes or longer. The higher the temperature is, the shorter is the time required for the impregnation. If the temperature is below 45° C., a sufficient effect cannot be obtained. On the other hand, an excessively long time for the impregnation does not bring about impregnation of metals proportionate to the length of time.

As Group VIII metals to be supported by the carrier, one or more of metals selected from iron, cobalt, nickel, palladium, platinum, osmium, iridium, ruthenium, rhodium, and the like can be used. Cobalt and nickel are preferable Group VIII metals, and can be used either individually or in combination.

The catalyst carrier can be prepared by conventional methods. Water soluble aluminum compounds are used as a raw material. Specific examples of water soluble aluminum compounds which can be used include aluminum sulfate, aluminum chloride, alkali metal aluminates, aluminum alkoxides, and other inorganic and organic aluminum salts. It is possible to add water soluble compounds, e.g., compounds of boron, titanium, silicon, zinc, etc., or silica, zeolite, boria, titania, or zinc oxide, to the aluminum compound solution.

In a typical example of preparing an alumina carrier, a hydrosol or hydrogel is first prepared by providing an acidic aluminum compound solution (concentration: about 0.3–2 mol/l) and an alkaline solution of an aluminate and adding to this mixed solution an alkali hydroxide solution to adjust the pH to about 6.0–11.0, preferably to about 8.0–10.5. Alternatively, aqueous ammonia, nitric acid, or acetic acid is added as appropriate to produce a suspension, which is then heated at about 50°–90° C. while adjusting the pH and maintained at this temperature for at least 2 hours. The precipitate thus obtained is collected by filtration and washed with ammonium carbonate and water to remove impurity ions. Then, silica, zeolite, boria, titania, or zinc oxide is added and kneaded, although these components may be added to the starting aluminum compound solution, as mentioned above.

Zeolite having any crystal structure, e.g., faujasite type, pentasil type, etc., may be used here.

In the preparation of the alumina gel, the hydrate of alumina or alumina-containing substance is produced while controlling the conditions such as temperature and the period of time during which the precipitate is produced and aged, such that the alumina or alumina-containing substance is provided with the mean pore diameter and the pore size distribution required for the hydrotreatment catalyst.

The alumina gel is then extruded into a desired shape by an extruder. The extruding is carried out while controlling the extruding pressure in order to obtain a desired mean pore diameter and pore size distribution. The extruded product is dried at about 100°–140° C. for several hours, followed by calcination at about 200°–1000° C. for several hours to obtain the carrier.

Another process for the manufacture of the catalyst composition which is the third invention is illustrated. As previously mentioned, in order to obtain the catalyst composition of the present invention the carrier should be treated under specific conditions; i.e., it must be treated with an acidic aqueous solution having a specific pH value at a specific temperature for a specified period of time, prior to impregnating Group VIB metals and Group VIII metals thereinto.

As the catalyst carrier, alumina containing at least one of boria, titania, and zinc oxide in an amount of 5–40% by weight is used. Either a kneading method or a coprecipitation method, or other method can be used for incorporating boria, titania, or zinc oxide into the carrier. As alumina, Gamma-alumina, Chi-alumina, or Eta-alumina, or a mixture of these can be used.

Components other than boria, titania, and zinc oxide, such as refractory oxides, e.g., magnesia, calcium oxide, zirconia, hafnia, etc., may be incorporated into the carrier, so long as the amount of boria, titania, and zinc oxide is within the range specified above.

An acidic aqueous solution with which the carrier is treated may be any aqueous solutions of inorganic acid, except for hydrofluoric acid solutions, such as aqueous solutions of nitric acid, hydrochloric acid, sulfuric acid, or the like. An especially preferred is an aqueous solution of nitric acid. Hydrofluoric acid cannot be used, since it destroys crystal structures of alumina. These acidic aqueous solutions have a pH of 1–5.5, and preferably of 2–4. If the pH is smaller than 1, the acid may destroy the crystal structures of alumina; if greater than 5.5, a sufficient effect cannot be obtained.

Illustrating the process for the manufacture of the catalyst composition according to the third invention by way of a preferred embodiment, an alumina carrier containing boria is added to purified water and the mixture is adjusted to pH 2.0 and is immersed at 60° C. for 24 hours, following which the carrier is promptly dried. Thereafter, molybdenum, nickel, or cobalt is impregnated by a conventional method. Specifically, the carrier thus treated is immersed into an aqueous solution of Group VIB metal compounds, e.g., water soluble molybdenum compound, and/or Group VIII metal compounds, e.g., water soluble cobalt or nickel compounds.

The temperature of the acidic aqueous solution with which the carrier is pretreated is from about 45° C. up to the boiling point of the solution. Accordingly, the temperature may be 100° C. or higher, when the pretreatment is performed in a pressure vessel. However, a temperature below 100° C. under atmospheric pressure is generally sufficient, with a preferred temperature range being 50°–80° C. The time for which the carrier is pretreated is about 60 minutes or longer, preferably 80 minutes or longer. The higher the temperature is, the shorter is the time required for the pretreatment. If the temperature is below 45° C., a sufficient effect cannot be obtained. On the other hand, an excessively long period of time for the pretreatment does not bring about an effect proportionate to the length of time.

The method of impregnating hydrogenation active metal components into the carrier is not restricted to the above method. Various methods, for example, a spray impregnation method in which a solution of hydrogenation active metal components are sprayed onto the carrier, can be applicable.

The catalyst carrier to be submitted to the pretreatment can be prepared by conventional methods. Water soluble aluminum compounds are used as a raw material. Specific examples of water soluble aluminum compounds which can be used include aluminum sulfate, aluminum chloride, alkali metal aluminates, aluminum alkoxides, and other inorganic and organic aluminum salts. It is possible to add water soluble compounds, e.g., compounds of boron, titanium, zinc, etc., or boria, titania, or zinc oxide, to the aluminum compound solution.

With respect to the order in which the hydrogenation active metal components are impregnated, either Group VIB metal compounds or Group VIII metal compounds may be impregnated first, or both may be impregnated simultaneously. It is desirable, however, to impregnate Group VIB metal compounds first.

One or more compounds of chromium, molybdenum, tungsten, or the like are used as Group VIB metal compounds to be impregnated. Among these, molybdenum compounds are preferred. Specific examples of preferable compounds include ammonium paramolybdate, tungstic acid, ammonium dichromate, and the like.

As Group VIII metals to be supported by the carrier, one or more metals selected from iron, cobalt, nickel, palladium, platinum, osmium, iridium, ruthenium, rhodium, and the like can be used. Cobalt and nickel are preferable Group VIII metals, and can be used either individually or in combination. Cobalt nitrate and nickel nitrate are preferable compounds used in the process.

As needed, metals other than Group VIB metals or Group VIII metals can be carried on the catalyst of the first invention, or can be used in the processes of manufacturing catalyst compositions of the second and third inventions.

In the catalyst compositions manufactured according to the processes of the second and third inventions, Group VIB metals and Group VIII metals are preferably supported by the carrier as oxides and/or sulfates.

The amounts of such hydrogenation active metals to be supported by the carrier, in terms of oxides and based on the total weight of the resulting catalyst composition, are usually 5–30% by weight, preferably 7–25% by weight, and more preferably 10–20% by weight, for Group VIB metals (as $XO_3$), and 1–10% by weight, preferably 2–8% by weight, for Group VIII metals (as $M_xO_y$, wherein M is a Group VIII metal).

A sufficient hydrogenation activity cannot be obtained, if the amount of Group VIB metals is less than 5% by weight, while the amount exceeding 30% by weight lowers dispersibility of these metals and tends to inhibit the auxiliary catalytic effect of Group VIII metals.

With respect to the amount of Group VIII metals, on the other hand, an amount less than 1% by weight does not bring about a sufficient effect, whereas an amount greater than 10% by weight increases free metals which are not bound to the carrier.

The resulting carrier on which hydrogenating active metal components are impregnated are then separated from the impregnation solution, washed with water, dried, and calcined. The same drying and calcination conditions as used in the preparation of the carrier are applicable for the drying and calcination of the catalyst.

It is especially desirable that the catalyst composition of the present invention possess a specific surface area of about 200–400 $m^2/g$, a total pore volume of about 0.4–0.9 ml/g, a bulk density of about 0.5–1.0 g/ml, and a side crush strength of about 0.8–3.5 Kg/mm. The catalyst composition prepared by the processes of the present invention serves as an ideal catalyst for the hydrotreatment of hydrocarbon oils.

Any type of reactors, a fixed bed, a fluidized bed, or a moving bed can be used for the hydrotreatment process using the catalyst composition of the present invention. From the aspect of simplicity of the equipment and operation procedures, the use of fixed bed reactors is preferred.

It is desirable to presulfurize the catalyst composition of the present invention before it is served for hydrotreatment reactions. The presulfurization can be carried out insitu in the reactor where the catalyst is used. In this instance, the catalyst composition of the present invention is contacted with sulfur-containing hydrocarbon oils, e.g. a sulfur-containing distillation fraction, at a temperature of about 150°–400° C., a pressure (total pressure) of about 15–150 $Kg/cm^2$, LHSV of about 0.1–8.0 $Hr^{-1}$, a hydrogen-containing gas/feed ratio of about 50–1500 l/l, following which the sulfur-containing fraction is switched to the raw feed and the operating conditions appropriate for the desulfurization of the raw feed is established, before initiating a normal operation.

An alternative method of the sulfur treatment of the catalyst composition of the present invention is to contact the catalyst directly with hydrogen sulfide or other sulfur compounds, or with a suitable hydrocarbon oil fraction to which hydrogen sulfide or other sulfur compounds are added.

"Hydrocarbon oils" as used in the present invention include light fractions from atmospheric or vacuum distillation of crude oils, atmospheric or vacuum distillation residues, coker light gas oils, oil fractions obtained from solvent deasphalting, tar sand oils, shale oils, coal liquefied oils, and the like.

Hydrotreatment conditions by using the catalyst composition of the present invention can be determined depending on the types of the raw feed oils, the intended desulfurization rate, the intended denitrification rate, and the like. Preferable conditions are usually about 300°–500° C., hydrogen pressure of about 20–200 Kg/cm$^2$, a hydrogen-containing gas/feed ratio of about 50–10,000 1/1, and LHSV of about 0.1–10 Hr$^{-1}$. A preferable hydrogen content in the hydrogen containing gas is about 60–100%.

The term "hydrotreatment" as used in the present invention generically denotes treatments of hydrocarbon oils by the contact with hydrogen, including low severity hydrogenation under comparatively mild conditions, hydrogenation under comparatively severe conditions which involve a cracking reaction of a certain degree, hydrogenation for isomerization, hydrogenation for dealkylation, and other reactions of hydrocarbon oils in the presence of hydrogen. For example, it includes hydrodesulfurization, hydrodenitrification, hydrodemetallization, and hydrocracking of topping or vacuum distillates and residues, as well as hydrotreatments for the refining of such fractions as kerosene, gas oil, wax, and lubrication oil.

In the catalyst composition of the present invention, Group VIII metals supported by the carrier such as nickel effectively functions as an auxiliary catalyst. On the other hand, nickel contained in hydrocarbon oils and removed together with vanadium during the hydrotreatment exhibits no function as an auxiliary catalyst. Because the nickel compounds from hydrocarbon oils are in forms different from those in the catalyst composition, they not only have a function of an auxiliary catalyst, but also decrease the catalyst activity by occluding pores of the catalyst and thus inhibiting hydrocarbon oils from entering the pores.

In the catalyst composition manufactured by the process of the second invention, concentrations of silica, zeolite, boria, titania, and zinc oxide on the surface of catalyst particles are changed by the treatment for impregnating Group VIB active metal compounds, in which excessive amounts of the metal impregnation solution as compared with the maximum pore volume of the carrier are used under specified conditions, e.g., temperature, pH of the impregnation solution, the time for the impregnation. This causes the Group VIB metal content distribution in catalyst particles to become higher toward the center than on the surface.

Furthermore, according to the process of the third invention, the use of an inorganic acid such as nitric acid in the acidic aqueous solution of pH 1–5.5 is considered to change the characteristics of the outer surface of carrier particles, thus differentiating the adsorptivity of Group VIB metal ions or ions containing the Group VIB metals. This is presumed to increase their concentration toward the center of the catalyst particles. As can be seen in the EPMA line analysis of the carriers obtained in Examples 12, 19, and 20 hereinafter, the concentrations of boria, titania, and zinc oxide in the carriers are smaller at the outermost surface due to dissolution of these compounds at the surface. This is considered to cause some changes in the characteristics on the surface of the catalyst particles, which presumably produces a number of sites on the surface which are less adsorptive of ions containing Group VIB metals than other sites, rendering the Group VIB metal content to become higher toward the center of catalyst particles than on their surface. The same mechanism applies to the adsorption of Group VIII metals by the carrier; i.e., there are sites on the surface of the carrier particles from which transition metal ions are adsorbed with difficulty, making the Group VIII metal content to become higher toward the center of catalyst particles than on the surface.

Because of these reasons, the catalyst composition of the present invention provides the desulfurization and demetallization activities which are equivalent to or higher than conventional catalyst compositions, even though the amounts of hydrogenation active metals supported by the carrier is smaller than the conventional catalyst. Since nickel, vanadium, and the like acting as catalyst poisons, which are contained in heavy hydrocarbon oils, are attached to the surface of the catalyst, they do not impair activities of catalytically active metals. Thus, their desulfurization activity can be maintained over a long period of time.

For example, in the case where the catalyst is replaced after a certain period of time, the catalyst of the present invention can ensure operations at a higher reaction temperature required for producing products with a higher desulfurization rate than conventional catalysts. When the reaction is carried out at a constant temperature, the catalyst of the present invention can maintain its desulfurization and demetallization activities for a longer period of time than conventional catalyst.

Other features of the invention will become apparent in the course of the following description of the exemplary embodiments which are given for illustration of the invention and are not intended to be limiting thereof.

EXAMPLES

Preparation of Catalyst Compositions According to the Second Invention

Example 1

An impregnation solution was prepared by charging 1,000 cc of distilled water into a 2,000 cc beaker and adding 44.1 g of ammonium paramolybdate tetrahydrate, followed by stirring to completely dissolve the ammonium paramolybdate tetrahydrate. 60 g of carrier, a 9:1 (by weight, hereinafter the same) mixture of Gamma-alumina and silica, in the form of cylinders with a diameter of 1.6 mm (1/16") and a length of 2–3 mm, was added. The carrier had a pore volume of about 0.7 cc/g (all carriers used in Examples Comparative Examples had a pore volume of about 0.7 cc/g). The mixture was adjusted to pH 2 by the addition of concentrated nitric acid and stirred for the impregnation for 24 hours. Promptly after the removal of liquid by filtration, the solid was dried at 120° C. and calcined at 500° C. for 2 hours to prepare a catalyst.

Of the catalyst composition obtained by the above procedure, 60 g was immersed into an impregnation solution comprising 6.2 g of nickel nitrate hexahydrate 6.2 g of cobalt nitrate hexahydrate dissolved in 60 cc of distilled water. The catalyst was dried at room temperature and calcined at 500° C. for 2 hours.

Figure 2:
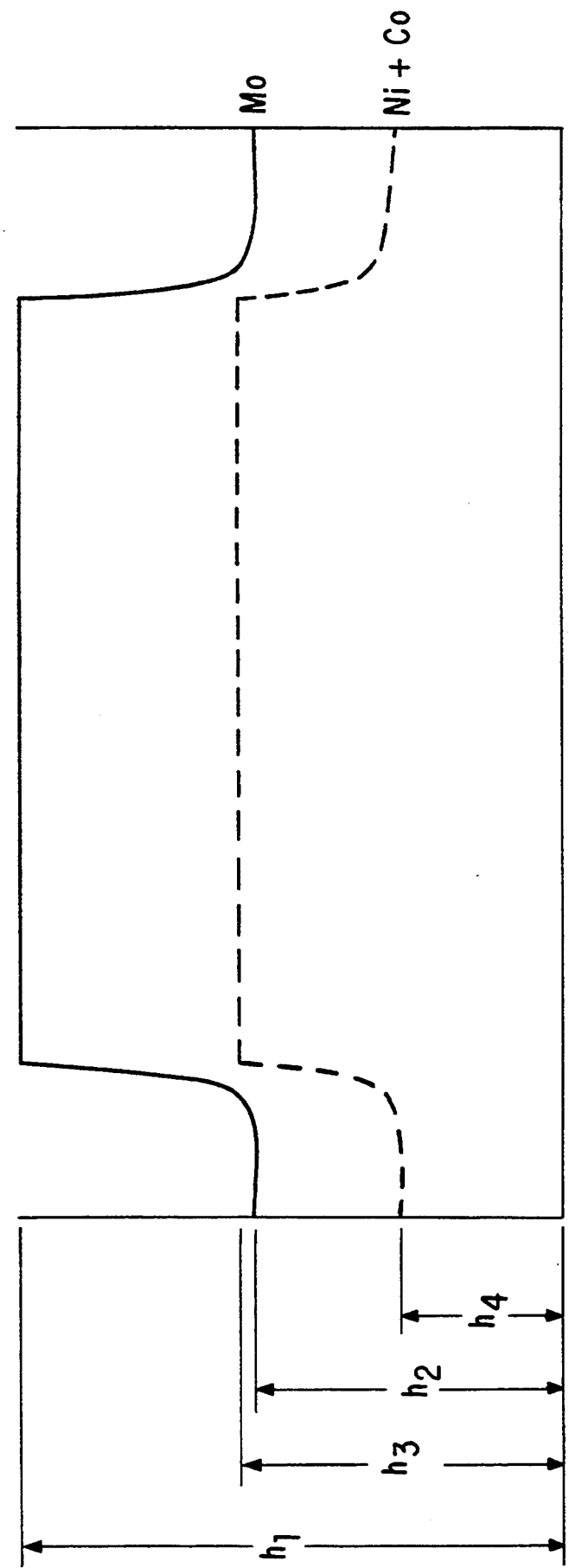
FIGS. 2-28 show distributions of Group VIB metals or Group VIII metals in the catalyst compositions obtained in Examples hereinafter described.

The composition, physical properties, $h_2/h_1$, and $h_4/h_3$ of the resulting catalyst composition are listed in Table 1. The result of the EPMA analysis is shown in FIG. 2.

Examples 2-4

Catalyst compositions were prepared in the same manner as in Example 1, except that the time for the impregnation, which was 24 hours in Example 1, was changed to 9 hours for Example 2, 6 hours for Example 3, and 3 hours for Example 4.

Figure 3:
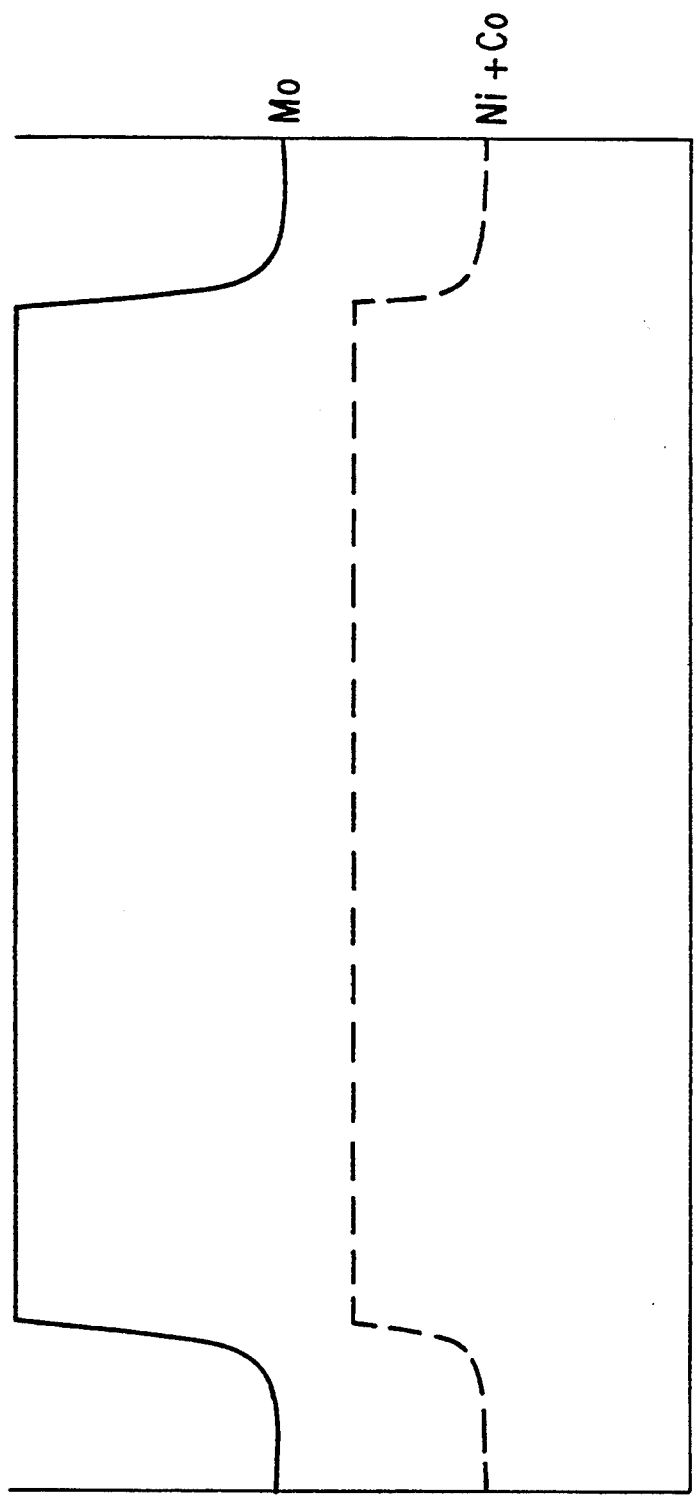
Figure 4:
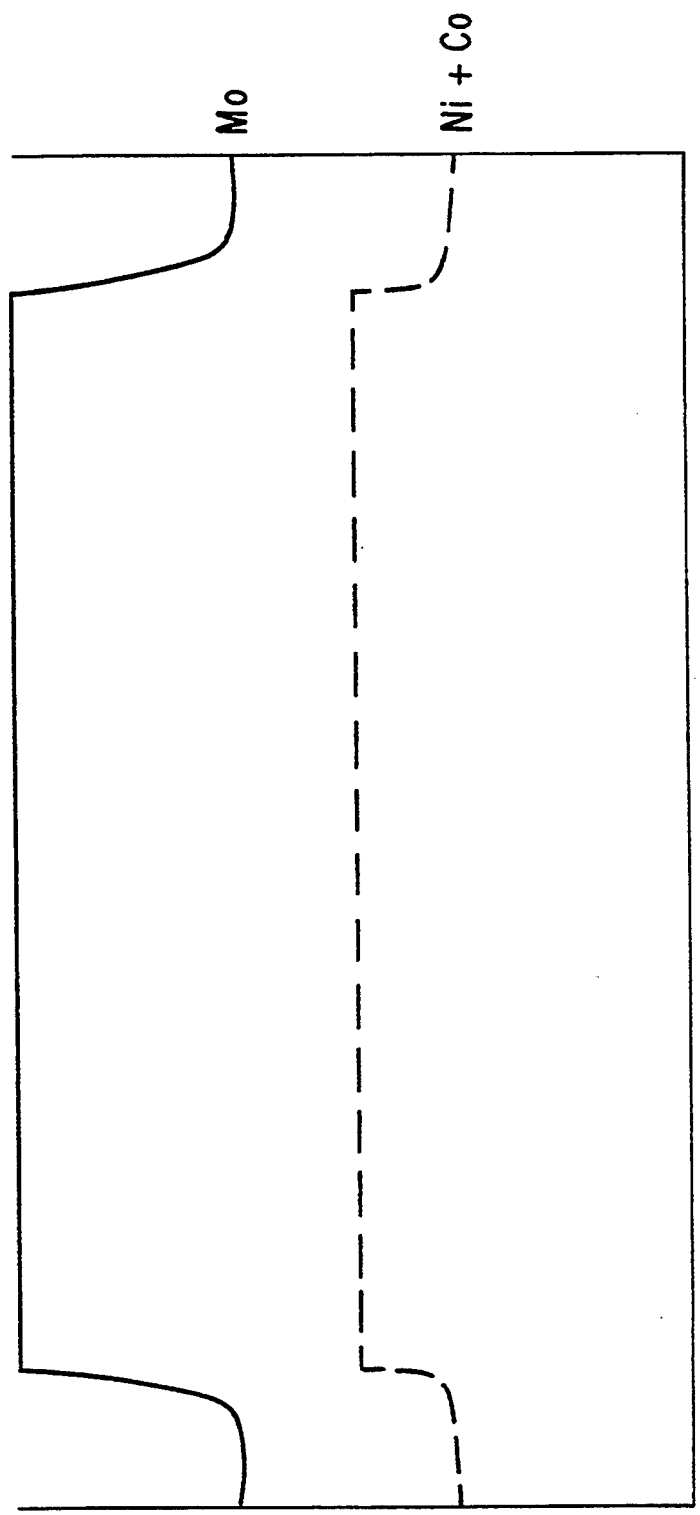
Figure 5:
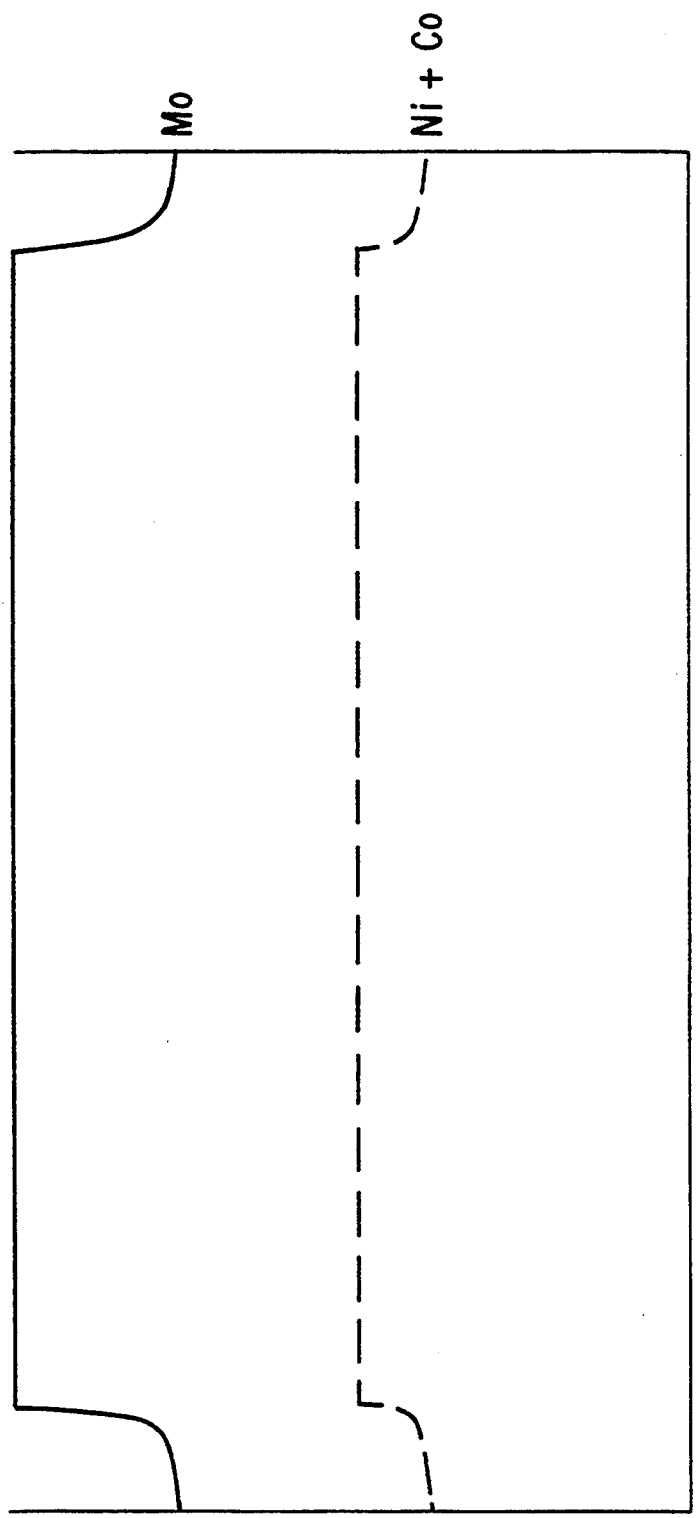

The composition, physical properties, $h_2/h_1$, and $h_4/h_3$ of the resulting catalyst compositions are listed in Table 1. The results of the EPMA analysis are shown in FIG. 3 (Example 2), FIG. 4 (Example 3), and FIG. 5 (Example 4).

Examples 5-6

Catalyst compositions were prepared in the same manner as in Example 1, except that the pH of the impregnation solution, pH 2 in Example 1, was changed to pH 3 for Example 5 and pH 4 for Example 6, respectively.

Figure 6:
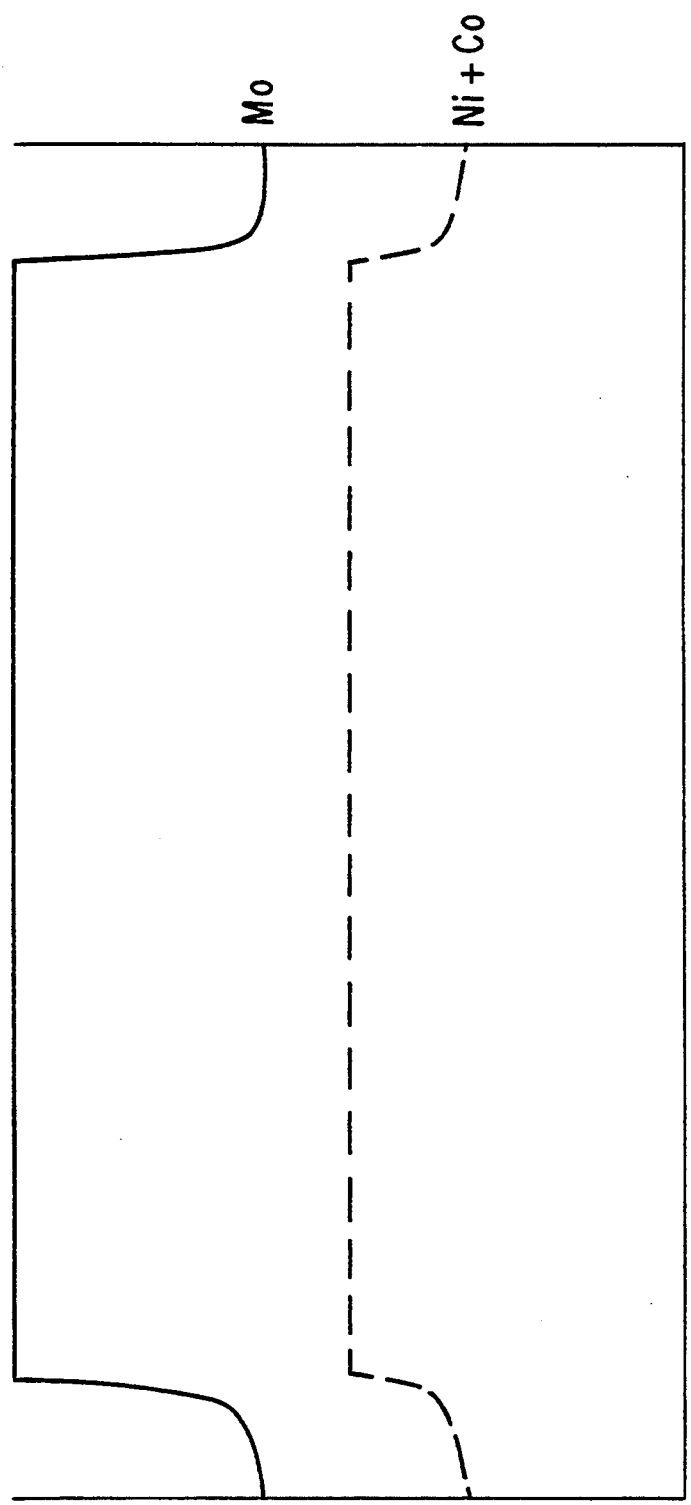
Figure 7:
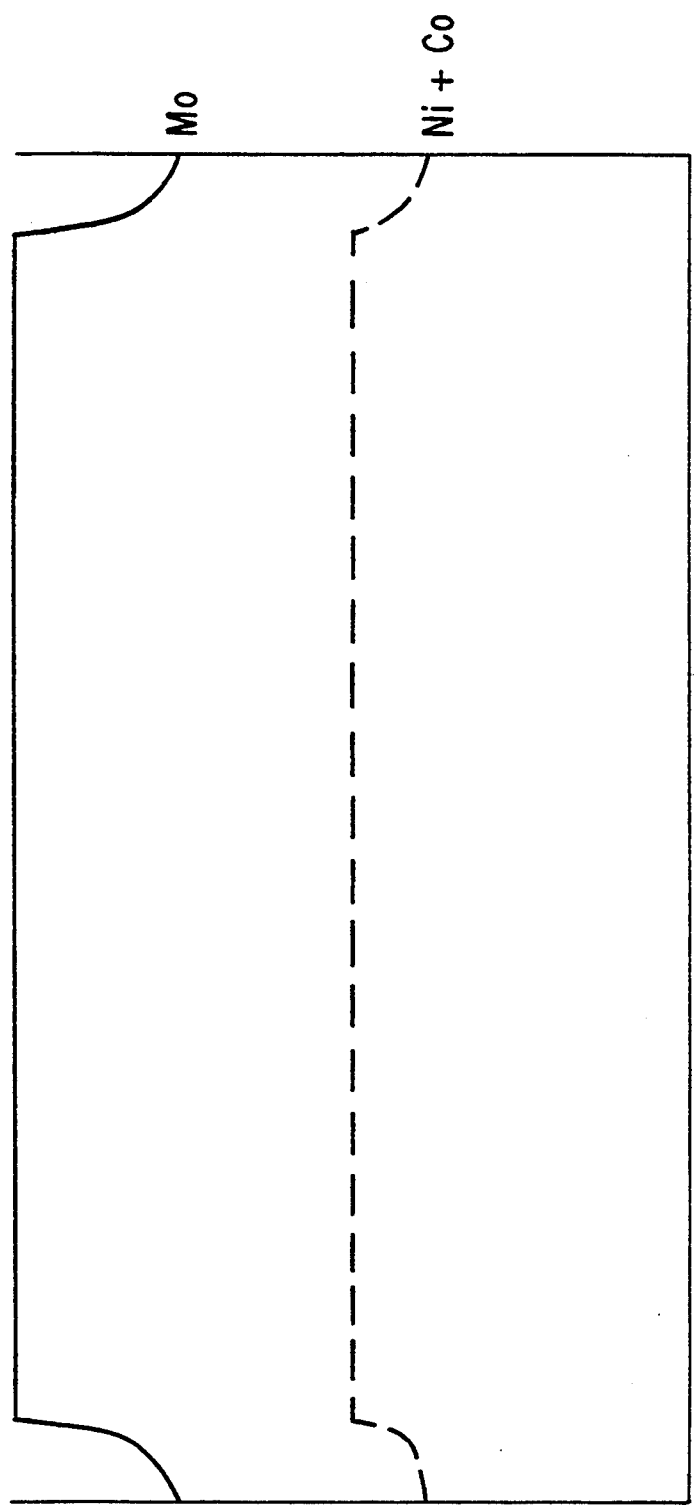

The composition, physical properties, $h_2/h_1$, and $h_4/h_3$ of the resulting catalyst compositions are listed in Table 1. The results of the EPMA analysis are shown in FIG. 6 (Example 5) and FIG. 7 (Example 6).

Example 7

A catalyst composition was prepared in the same manner as in Example 1, except that the temperature of the impregnation solution was 80° C. instead of 60° C. in Example 1.

Figure 8:
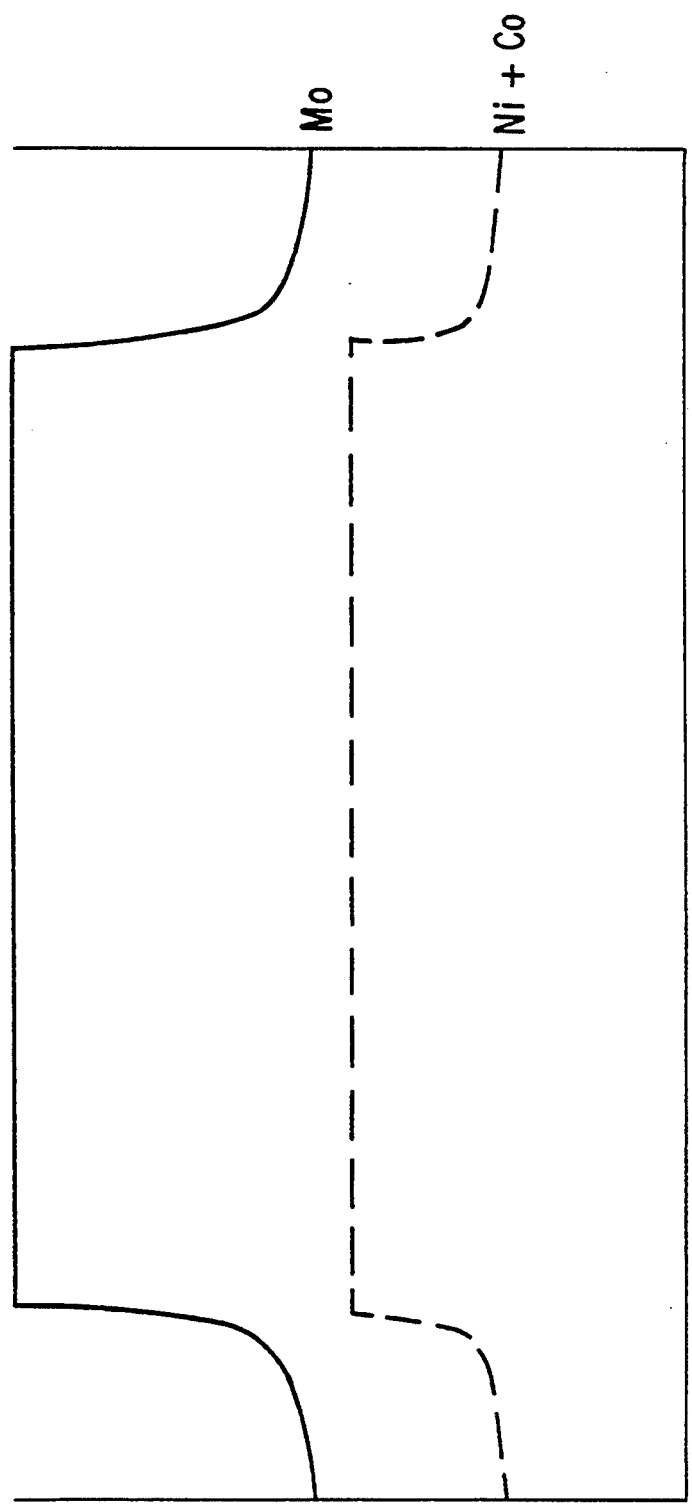

The composition, physical properties, $h_2/h_1$, and $h_4/h_3$ of the resulting catalyst composition are listed in Table 1. The results of the EPMA analysis are shown in FIG. 8.

Example 8

A catalyst composition was prepared in the same manner as in Example 1, except that a 9:1 mixture of Gamma-alumina and zeolite was used as a carrier instead of the 9:1 mixture of Gamma-alumina and silica in Example 1.

Figure 9:
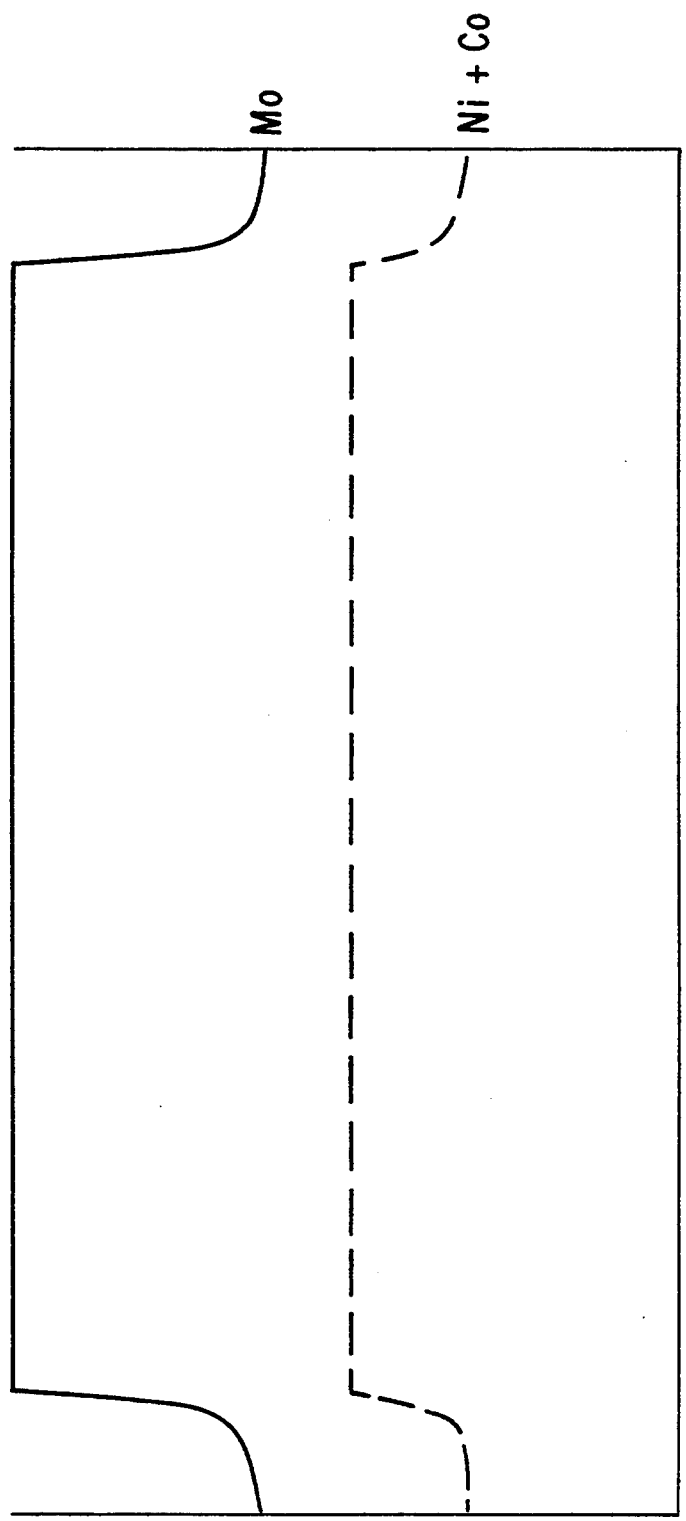

The composition, physical properties, $h_2/h_1$, and $h_4/h_3$ of the resulting catalyst compositions are listed in Table 1. The results of the EPMA analysis are shown in FIG. 9.

Example 9

A catalyst composition was prepared in the same manner as in Example 1, except that a 8:2 mixture of Gamma-alumina and zeolite was used as a carrier instead of the 9:1 mixture of Gamma-alumina and silica in Example 1.

Figure 10:
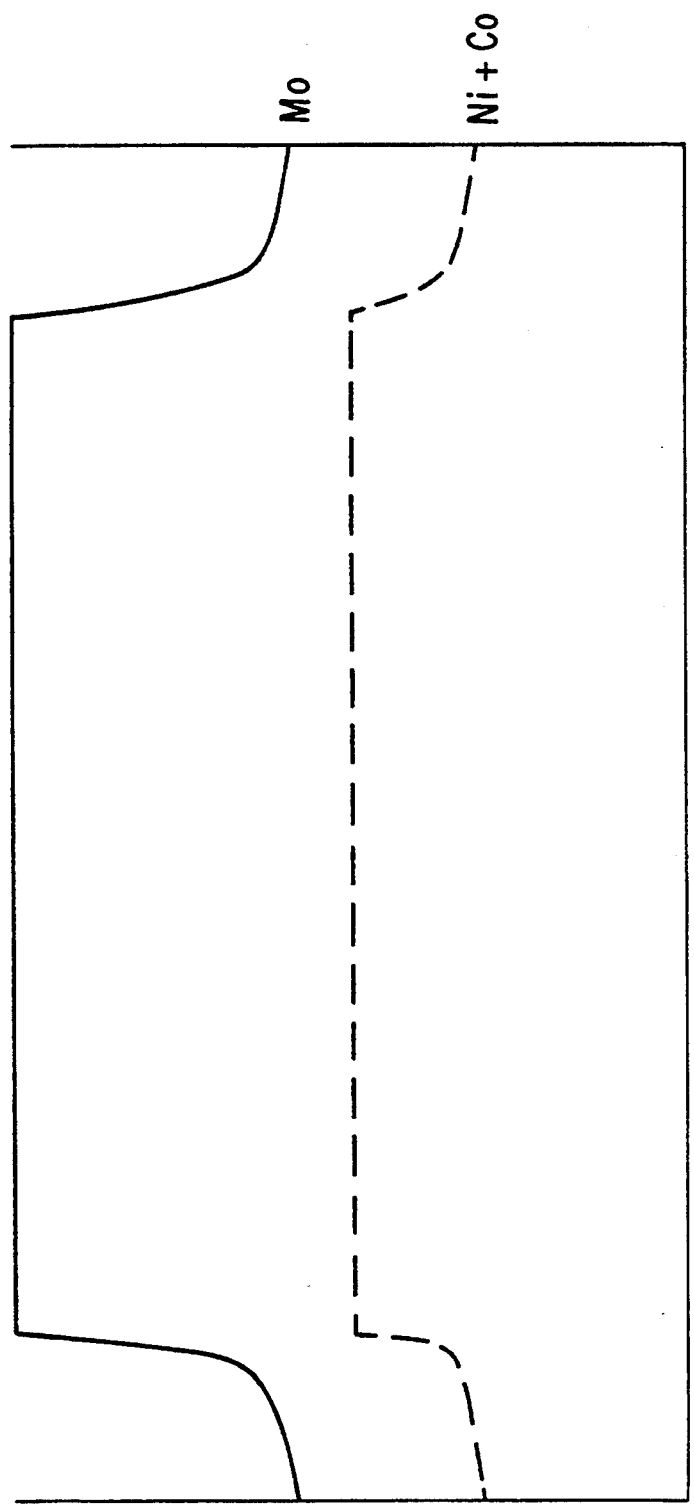

The composition, physical properties, $h_2/h_1$, and $h_4/h_3$ of the resulting catalyst composition are listed in Table 1. The results of the EPMA analysis are shown in FIG. 10. Examples 10-11

Catalyst compositions were prepared in the same manner as in Example 1, except that 62.7 g of tungstic acid (Example 10) or 31.6 g of ammonium dichromate (Example 11) was used instead of 44.1 g of ammonium paramolybdate tetrahydrate of Example 1.

The composition, physical properties, $h_2/h_2$, and $h_4/h_3$ of the resulting catalyst compositions are listed in Table 1.

Comparative Examples

Comparative Example 1

100 g of a 9:1 mixture of Gamma-alumina and silica was immersed into an impregnation solution prepared by dissolving 15 cc of aqueous concentrated ammonia solution and 32.7 g of ammonium paramolybdate in 85 cc of distilled water, and calcined at 500° C. to support Mo onto the carrier. The carrier was then immersed into an impregnation solution of 10.3 g of nickel nitrate hexahydrate and 10.3 g of cobalt nitrate hexahydrate completely dissolved into 100 cc of distilled water, followed by calcination at 500° C. to support Ni and Co onto the carrier.

The composition, physical properties, $h_2/h_1$, and $h_4/h_3$ of the resulting catalyst composition are listed in Table 1.

Comparative Example 2

A catalyst composition was prepared in the same manner as in Comparative Example 1, except for using 25.0 g of ammonium paramolybdate tetrahydrate, 9.7 of nickel nitrate hexahydrate and 9.7 g of cobalt nitrate hexahydrate.

The composition, physical properties, $h_1/h_1$, and $h_4/h_3$ of the resulting catalyst composition are listed in Table 1.

Comparative Example 3

A catalyst composition was prepared in the same manner as in Comparative Example 1, except that a 9:1 mixture of Gamma-alumina and zeolite was used as a carrier instead of the 9:1 mixture of Gamma-alumina and silica in Comparative Example 1.

The composition, physical properties, $h_2/h_1$, and $h_4/h_3$ of the resulting catalyst composition are listed in Table 1.

Comparative Example 4

A catalyst composition was prepared in the same manner as in Comparative Example 1, except that an 8:2 mixture of Gamma-alumina and zeolite was used as a carrier instead of the 9:1 mixture of Gamma-alumina and silica in Comparative Example 1.

The composition, physical properties, $h_2/h_1$, and $h_4/h_3$ of the resulting catalyst composition are listed in Table 1.

TABLE 1

| | Group VIB metal | | Group VIII metal | | | | $SiO_2$ | | | |
| | Compound | Amount (wt %) | Compound | Amount (wt %) | Compound | Amount (wt %) | Amount (wt %) | $h_2/h_1$ | $h_4/h_3$ | Specific surface area (m²/g) |
|---|---|---|---|---|---|---|---|---|---|---|
| Example | | | | | | | | | | |
| 1 | $MoO_3$ | 20.0 | NiO | 2.5 | CoO | 2.5 | 9.5 | 0.57 | 0.60 | 310 |
| 2 | $MoO_3$ | 19.4 | NiO | 2.5 | CoO | 2.5 | 9.3 | 0.62 | 0.62 | 298 |
| 3 | $MoO_3$ | 18.6 | NiO | 2.5 | CoO | 2.5 | 9.1 | 0.68 | 0.69 | 295 |
| 4 | $MoO_3$ | 19.0 | NiO | 2.5 | CoO | 2.5 | 8.8 | 0.76 | 0.77 | 288 |
| 5 | $MoO_3$ | 17.2 | NiO | 2.5 | CoO | 2.5 | 9.5 | 0.63 | 0.64 | 275 |
| 6 | $MoO_3$ | 15.4 | NiO | 2.5 | CoO | 2.5 | 9.3 | 0.75 | 0.74 | 271 |

TABLE 1-continued

| | Group VIB metal | | Group VIII metal | | | | SiO2 | | | |
|---|---|---|---|---|---|---|---|---|---|---|
| | Compound | Amount (wt %) | Compound | Amount (wt %) | Compound | Amount (wt %) | Amount (wt %) | h2/h1 | h4/h3 | Specific surface area (m²/g) |
| 7 | MoO3 | 20.5 | NiO | 2.5 | CoO | 2.5 | 11.3 | 0.55 | 0.55 | 316 |
| 8 | MoO3 | 18.3 | NiO | 2.5 | CoO | 2.5 | 7.1* | 0.64 | 0.65 | 314 |
| 9 | MoO3 | 17.2 | NiO | 2.5 | CoO | 2.5 | 14.0* | 0.59 | 0.58 | 331 |
| 10 | WO3 | 17.2 | NiO | 2.5 | CoO | 2.5 | 9.8 | 0.57 | 0.60 | 308 |
| 11 | CrO3 | 15.8 | NiO | 2.5 | CoO | 2.5 | 9.3 | 0.57 | 0.60 | 309 |
| Comparative Example | | | | | | | | | | |
| 1 | MoO3 | 19.1 | NiO | 2.5 | CoO | 2.5 | 8.0 | 1.00 | 1.00 | 278 |
| 2 | MoO3 | 17.8 | NiO | 2.5 | CoO | 2.5 | 9.3 | 1.00 | 1.00 | 282 |
| 3 | MoO3 | 17.9 | NiO | 2.5 | CoO | 2.5 | 9.1* | 1.00 | 1.00 | 308 |
| 4 | MoO3 | 17.4 | NiO | 2.5 | CoO | 2.5 | 8.8* | 1.00 | 1.00 | 320 |

*Zeolite

Example 12

A catalyst composition was prepared in the same manner as in Example 1, except that a 9:1 mixture of Gamma-alumina and boria was used as a carrier instead of the 9:1 mixture of Gamma-alumina and silica in Example 1.

Figure 11:
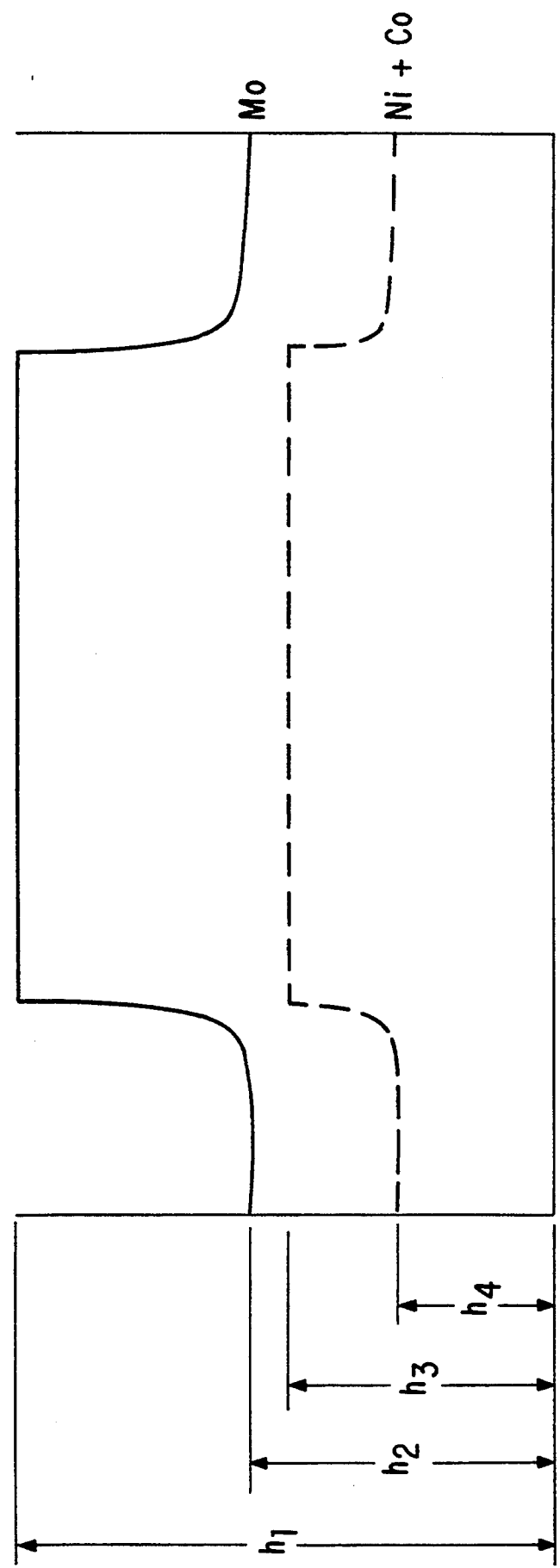

The composition, physical properties, $h_2/h_1$, and $h_4/h_3$ of the resulting catalyst composition are listed in Table 2. The results of the EPMA analysis are shown in FIG. 11.

In addition, the distribution of boria, titania, and zinc oxide in the catalyst compositions determined by the EPMA line analysis is shown in FIG. 1.

Examples 13–15

Catalyst compositions were prepared in the same manner as in Example 12, except that the time for the impregnation, which was 24 hours in Example 12, was changed to 9 hours for Example 13, 6 hours for Example 14, and 3 hours for Example 15.

Figure 12:
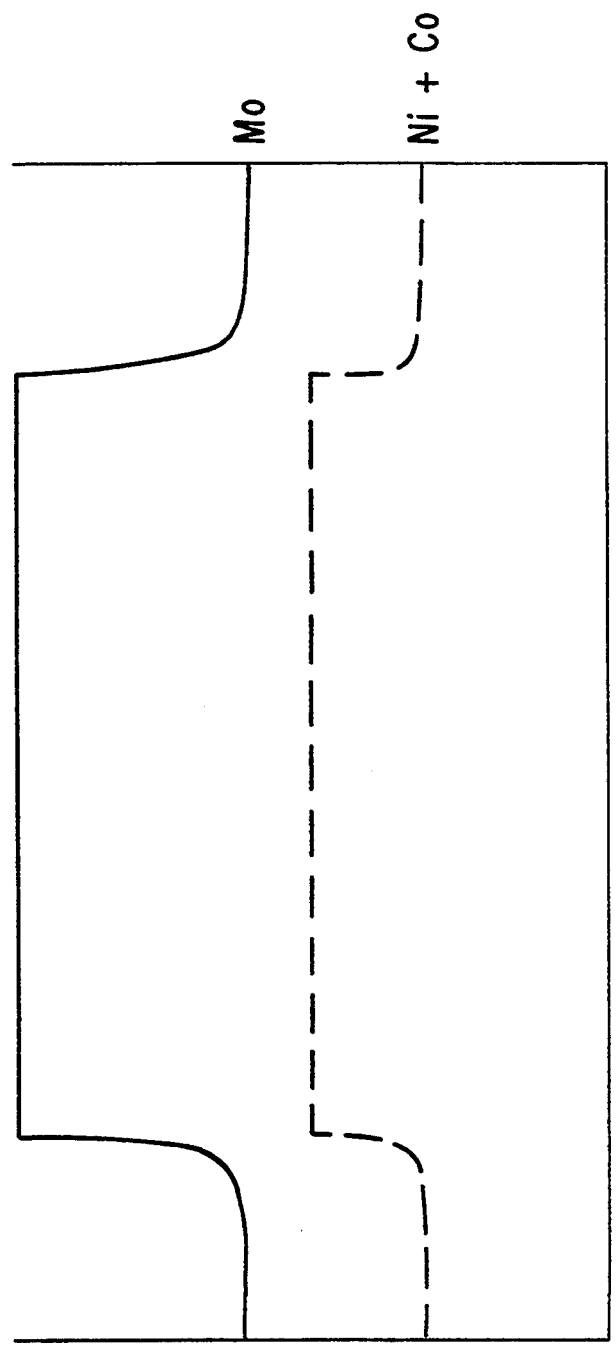
Figure 13:
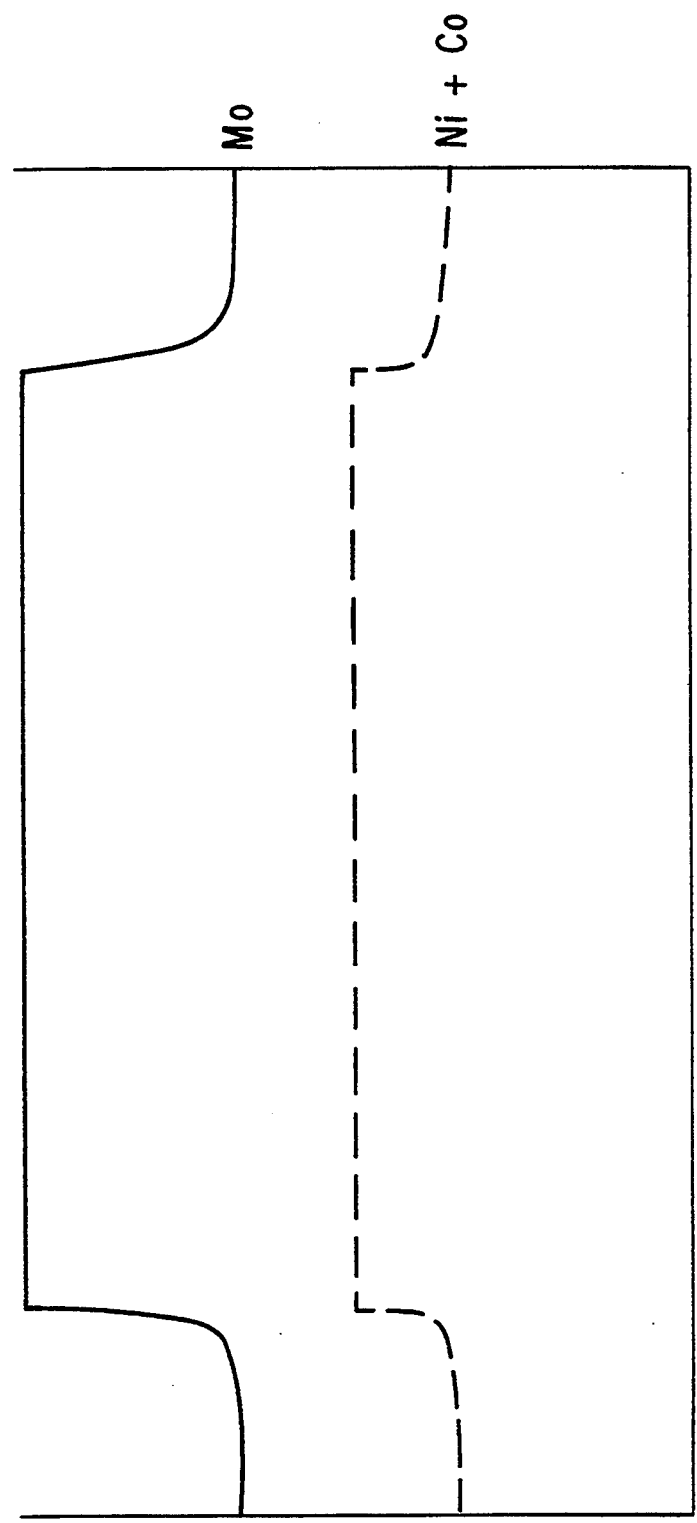
Figure 14:
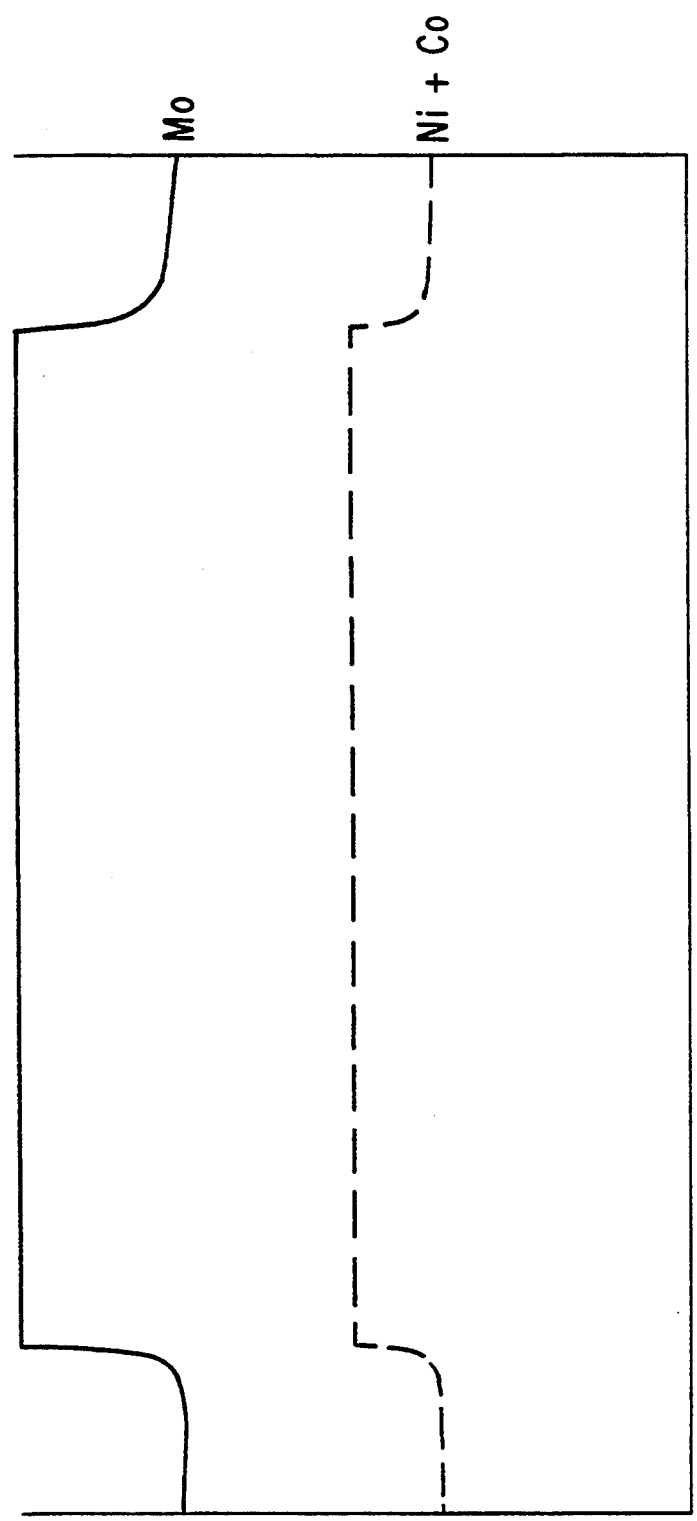

The composition, physical properties, $h_2/h_1$, and $h_4/h_3$ of the resulting catalyst compositions are listed in Table 2. The results of the EPMA analysis are shown in FIG. 12 (Example 13), FIG. 13 (Example 14), and FIG. 14 (Example 15).

Examples 16–17

Catalyst compositions were prepared in the same manner as in Example 12, except that the pH of the impregnation solution, pH 2 in Example 12, was changed to pH 3 for Example 16 and pH 4 for Example 17, respectively.

Figure 15:
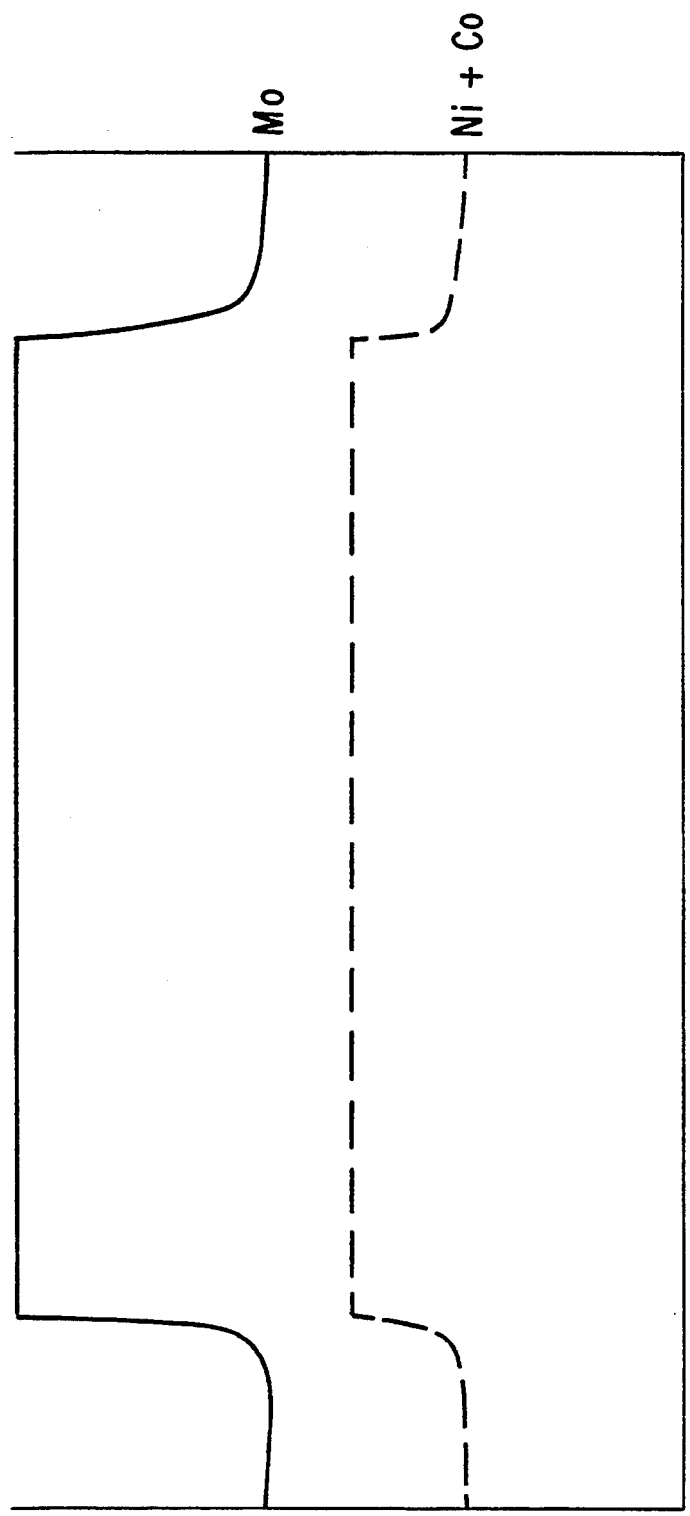
Figure 16:
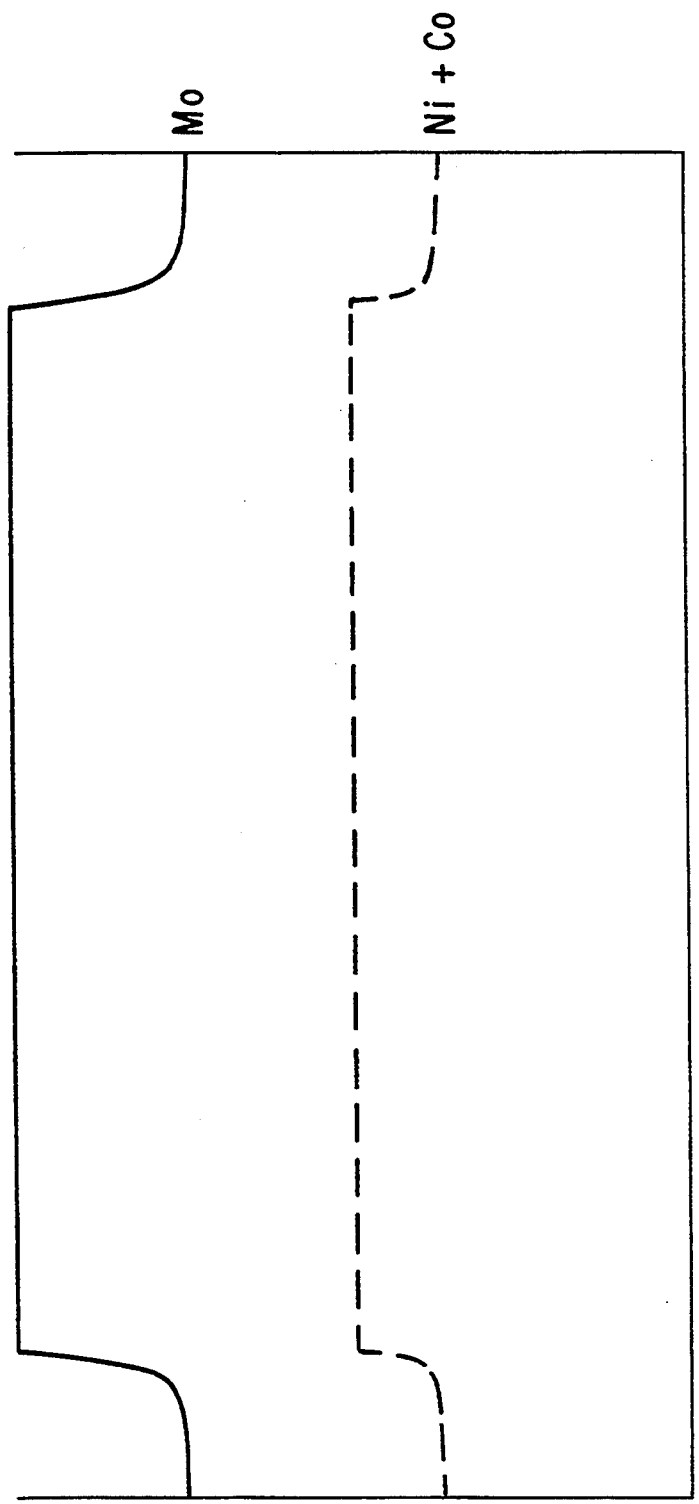

The composition, physical properties, $h_2/h_1$, and $h_4/h_3$ of the resulting catalyst compositions are listed in Table 2. The results of the EPMA analysis are shown in FIG. 15 (Example 16) and FIG. 16 (Example 17).

Example 18

A catalyst composition was prepared in the same manner as in Example 12, except that the temperature of the impregnation solution was 80° C. instead of 60° C. in Example 12.

Figure 17:
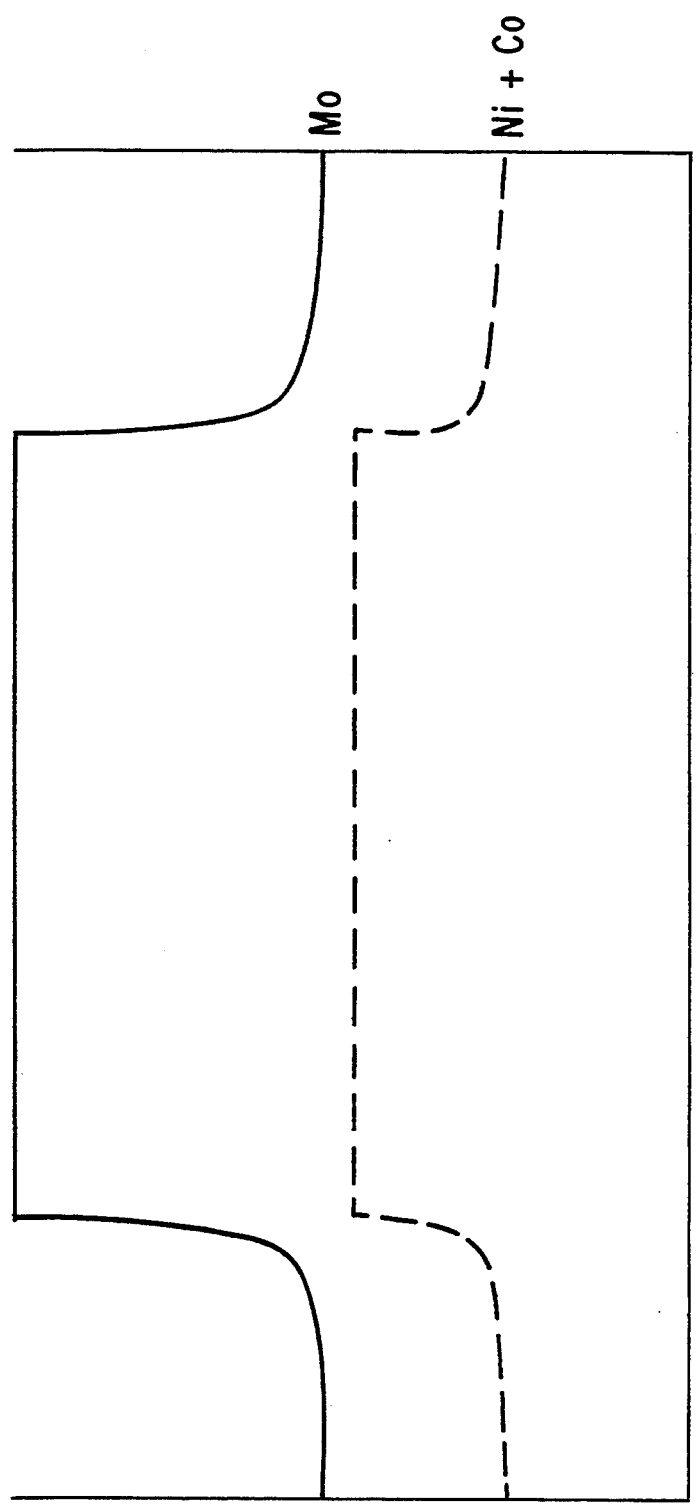

The composition, physical properties, $h_2/h_1$, and $h_4/h_3$ of the resulting catalyst composition are listed in Table 2. The results of the EPMA analysis are shown in FIG. 17.

Example 19

A catalyst composition was prepared in the same manner as in Example 12, except that a 9:1 mixture of Gamma-alumina and titania was used as a carrier instead of the 9:1 mixture of Gamma-alumina and boria in Example 12.

Figure 18:
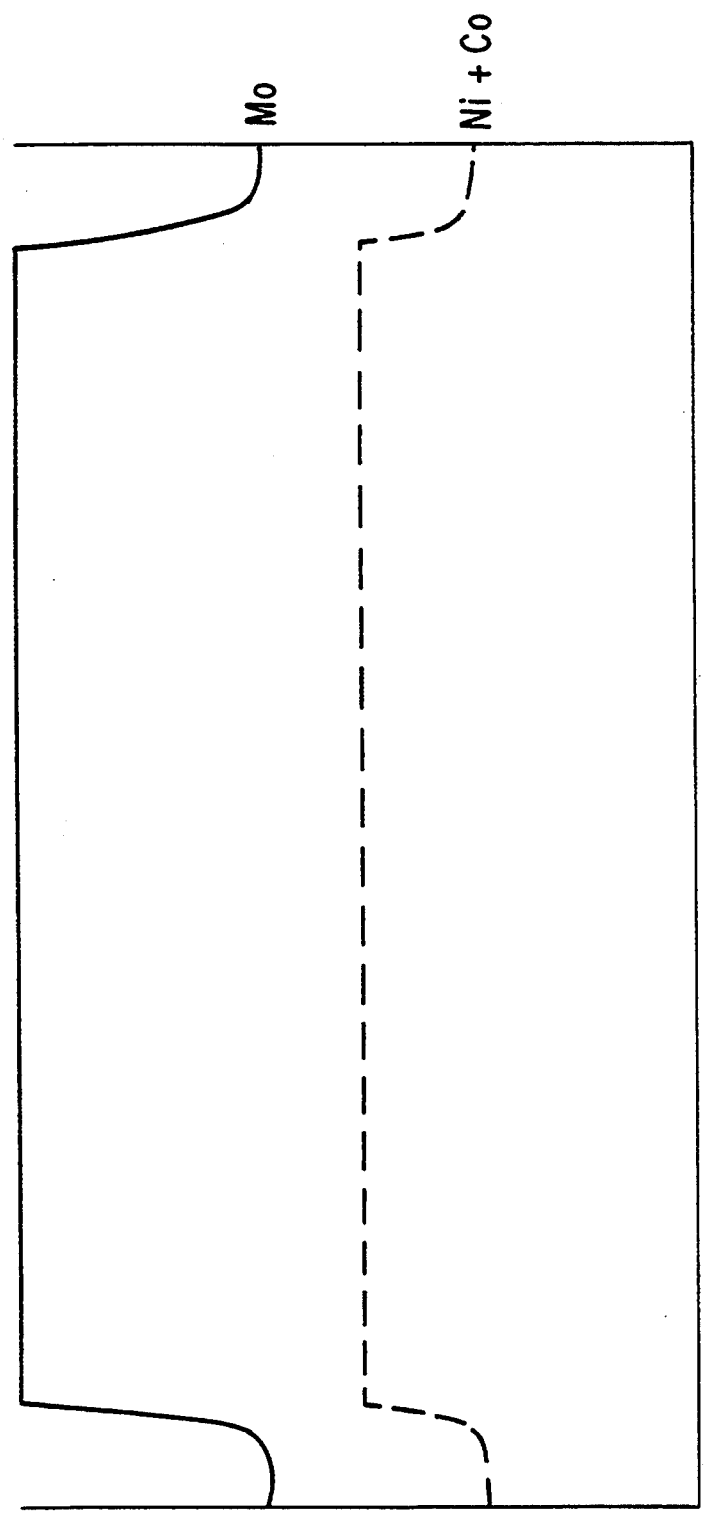

The composition, physical properties, $h_2/h_1$, and $h_4/h_3$ of the resulting catalyst composition are listed in Table 2. The results of the EPMA analysis are shown in FIG. 18.

In addition, the distribution of boria, titania, and zinc oxide in the catalyst compositions determined by the EPMA line analysis is shown in FIG. 1.

Example 20

A catalyst composition was prepared in the same manner as in Example 12, except that a 9:1 mixture of Gamma-alumina and zinc oxide was used as a carrier instead of the 9:1 mixture of Gamma-alumina and boria in Example 12.

Figure 19:
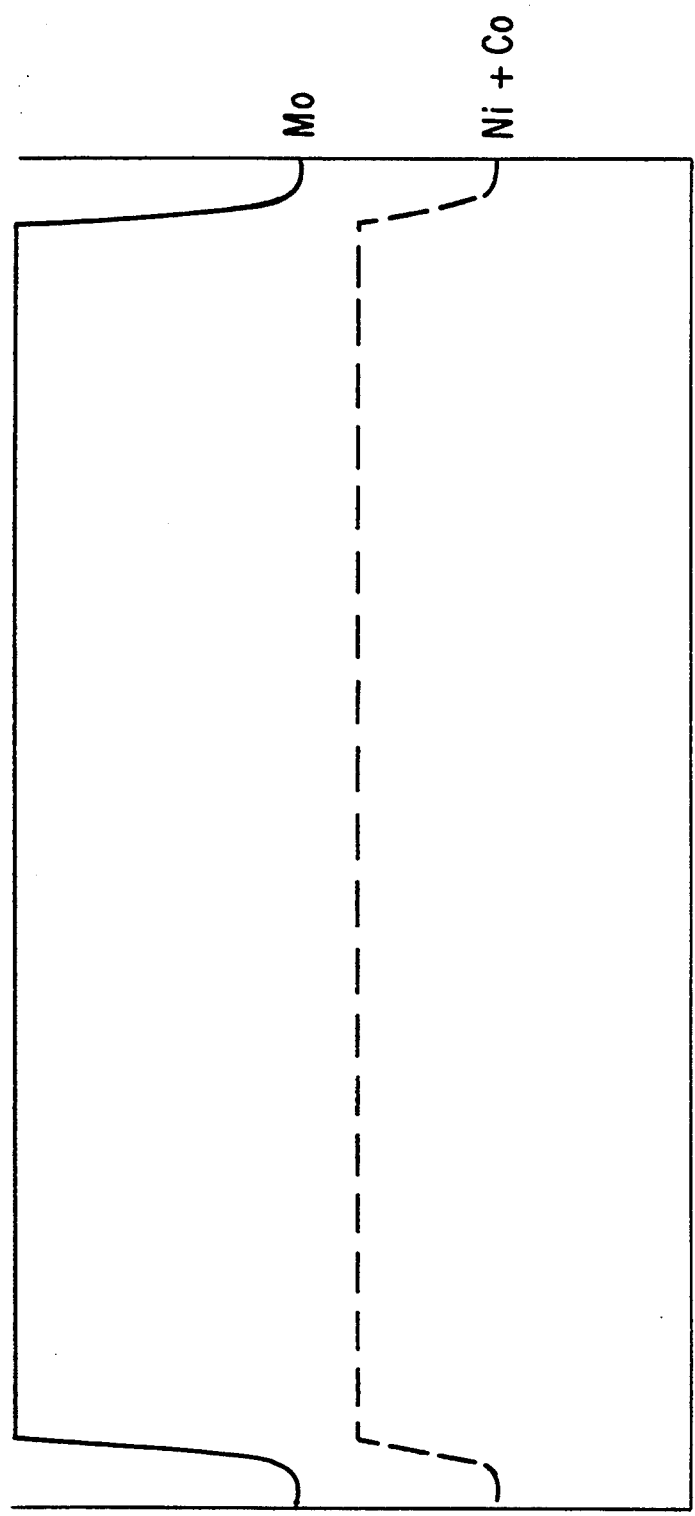

The composition, physical properties, $h_2/h_1$, and $h_4/h_3$ of the resulting catalyst composition are listed in Table 2. The results of the EPMA analysis are shown in FIG. 19.

In addition, the distribution of boria, titania, and zinc oxide in the catalyst compositions determined by the EPMA line analysis is shown in FIG. 1. Examples 21–22

Catalyst compositions were prepared in the same manner as in Example 12, except that 62.7 g of tungstic acid (Example 21) or 31.6 g of ammonium dichromate (Example 22) was used instead of 44.1 g of ammonium paramolybdate tetrahydrate of Example 12.

The composition, physical properties, $h_2/h_1$, and $h_4/h_3$ of the resulting catalyst compositions are listed in Table 2.

Comparative Examples

Comparative Example 5

A catalyst composition was prepared in the same manner as in Comparative Example 1, except that a 9:1 mixture of Gamma-alumina and boria was used as a carrier instead of the 9:1 mixture of Gamma-alumina and silica in Comparative Example 1.

The composition, physical properties, $h_2/h_1$, and $h_4/h_3$ of the resulting catalyst composition are listed in Table 2.

Comparative Example 6

A catalyst composition was prepared in the same manner as in Comparative Example 5, except for using 25.0 g of ammonium paramolybdate tetrahydrate, 9.7 of nickel nitrate hexahydrate and 9.7 g of cobalt nitrate hexahydrate.

The composition, physical properties, $h_2/h_1$, and $h_4/h_3$ of the resulting catalyst composition are listed in Table 2.

Comparative Example 7

A catalyst composition was prepared in the same manner as in Comparative Example 5, except that a 9:1 mixture of Gamma-alumina and titania was used as a carrier instead of the 9:1 mixture of Gamma-alumina and boria in Comparative Example 5.

The composition, physical properties, $h_2/h_1$, and $h_4/h_3$ of the resulting catalyst composition are listed in Table 2.

Comparative Example 8

A catalyst composition was prepared in the same manner as in Comparative Example 5, except that a 9:1 mixture of Gamma-alumina and zinc oxide was used as a carrier instead of the 9:1 mixture of Gamma-alumina and boria in Comparative Example 5.

The composition, physical properties, $h_2/h_1$, and $h_4/h_3$ of the resulting catalyst composition are listed in Table 2.

and calcined at 500° C for 2 hours, thus supporting nickel and cobalt onto the carrier.

Figure 20:
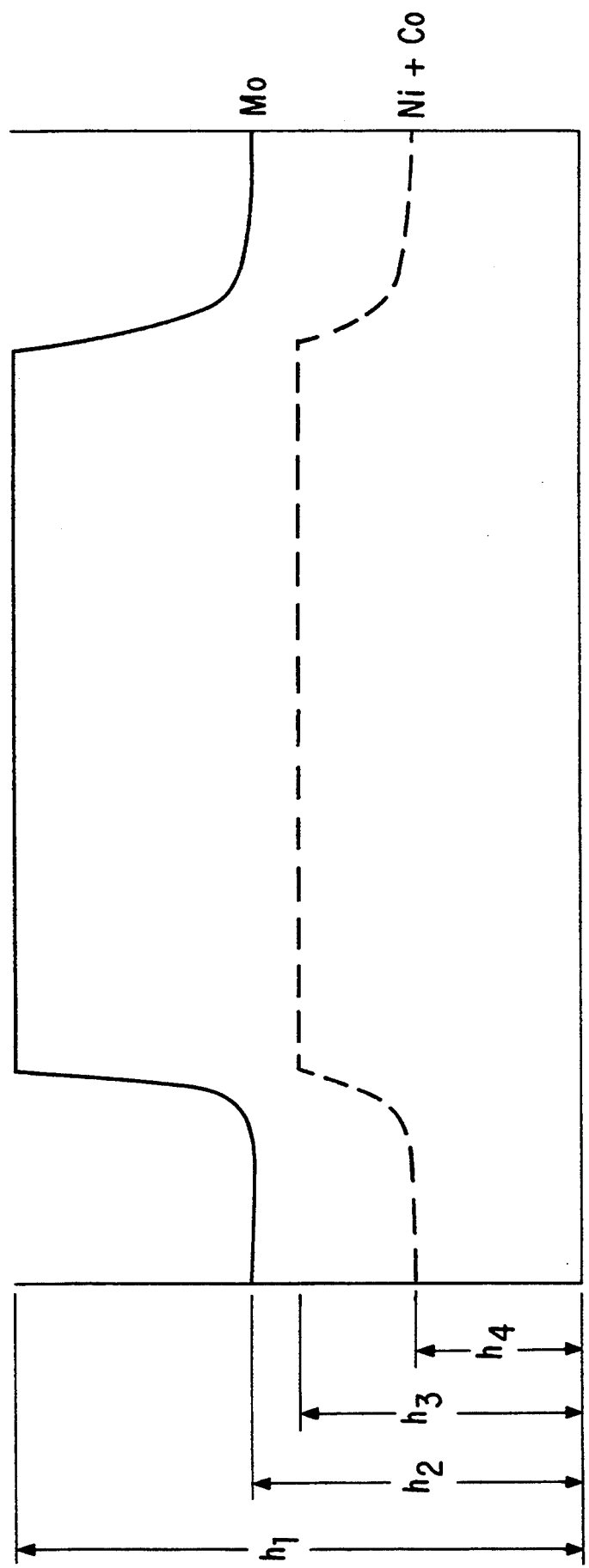

The composition, physical properties, $h_2/h_1$, and $h_4/h_3$ of the resulting catalyst composition are listed in Table 3. The result of the EPMA analysis is shown in FIG. 20.

Examples 24-26

Catalyst compositions were prepared in the same manner as in Example 23, except that the time for the impregnation, which was 24 hours in Example 23, was changed to 9 hours for Example 24, 6 hours for Example 25, and 3 hours for Example 26.

Figure 21:
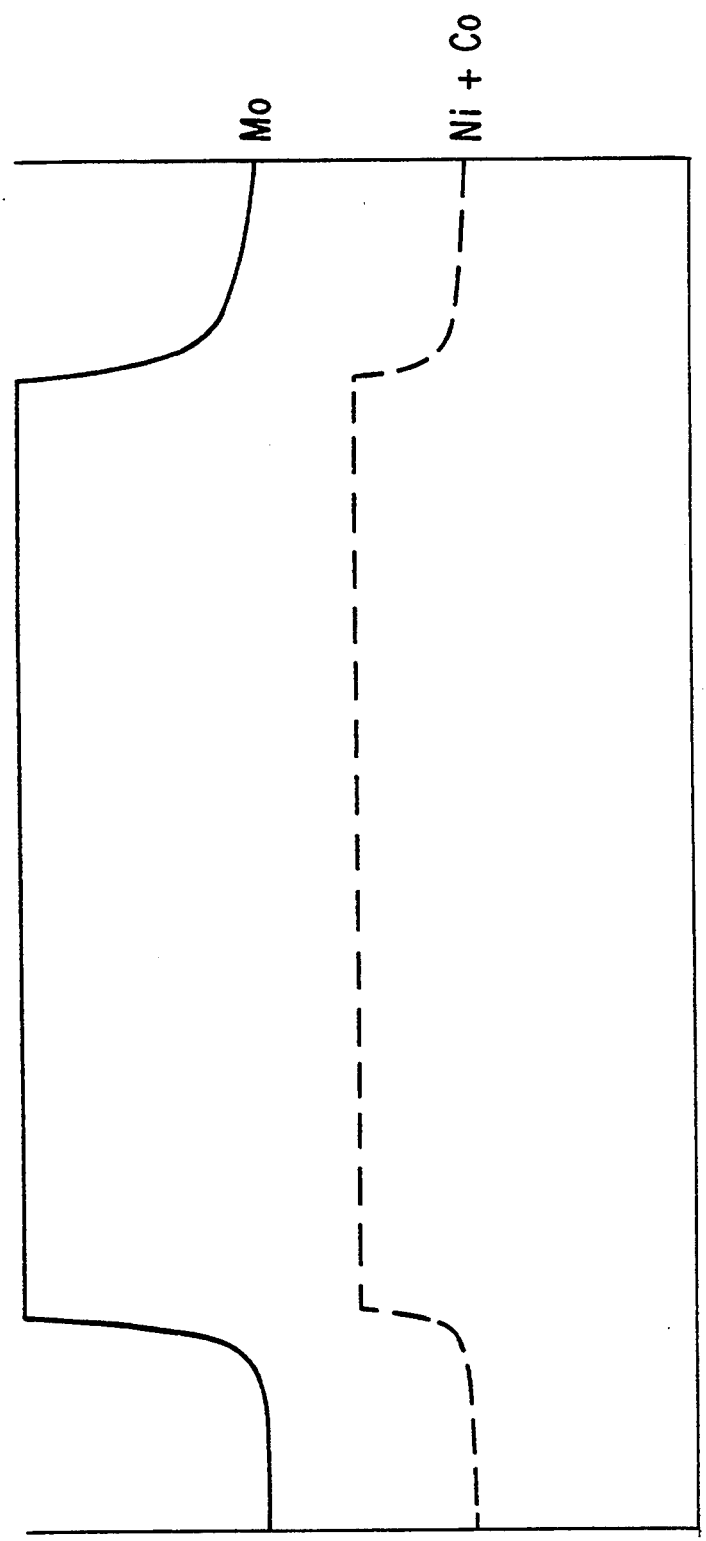
Figure 22:
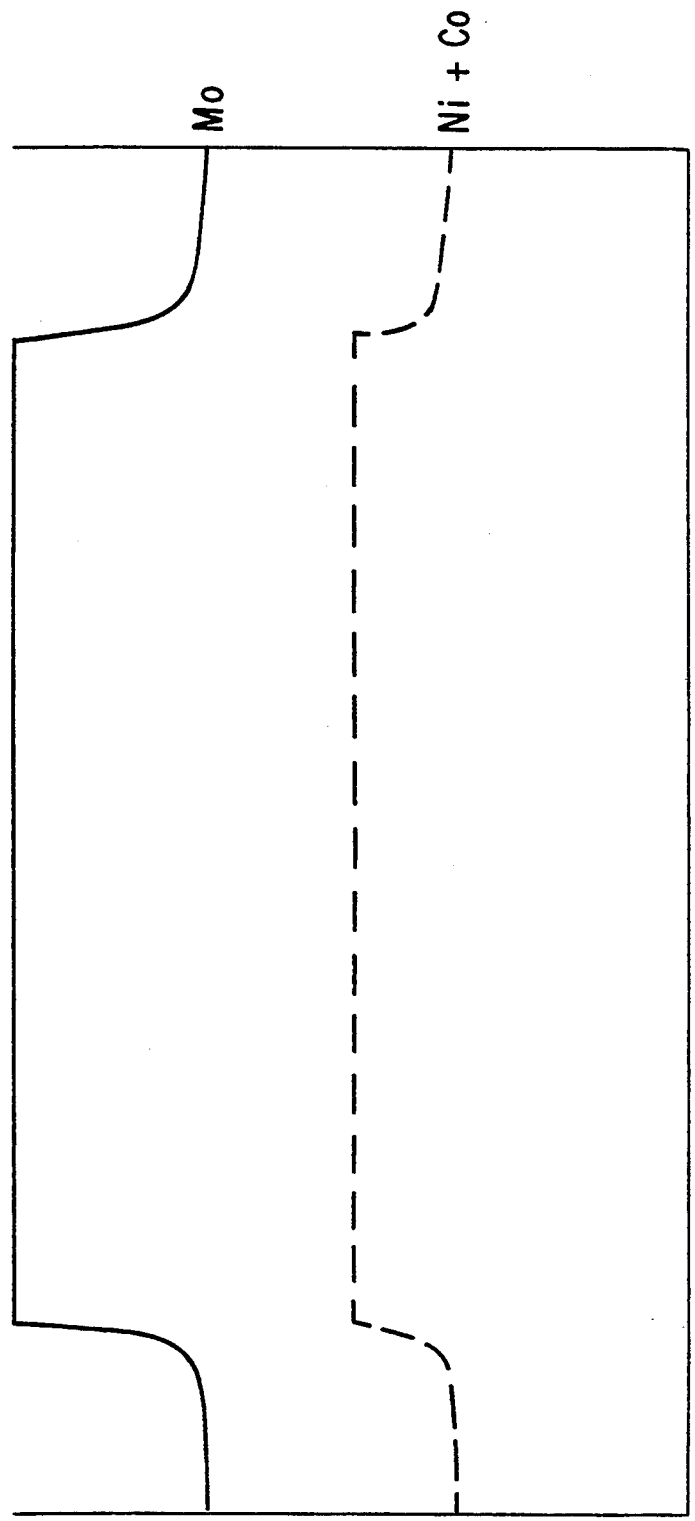
Figure 23:
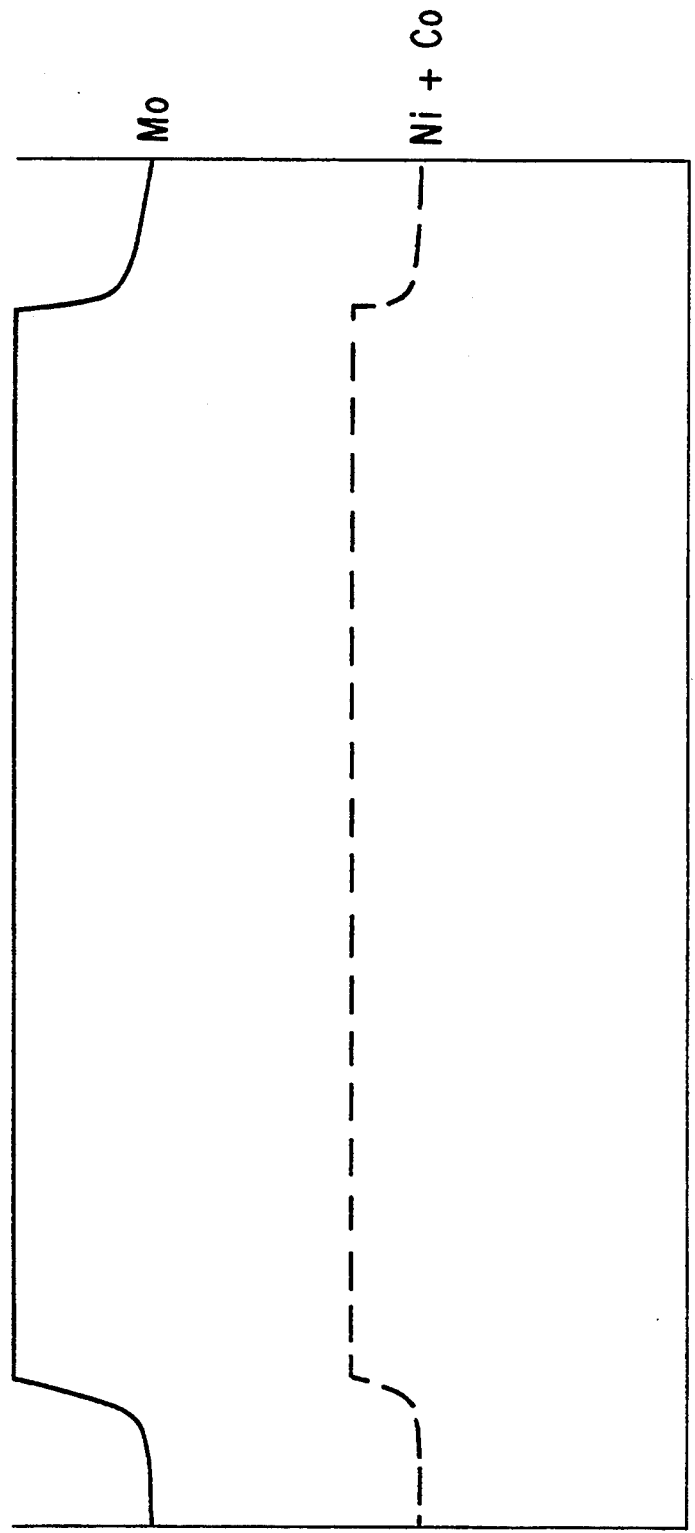

The composition, physical properties, $h_2/h_1$, and $h_4/h_3$ of the resulting catalyst compositions are listed in Table 3. The results of the EPMA analysis are shown in FIG. 21 (Example 24), FIG. 22 (Example 25), and FIG. 23 (Example 26).

Examples 27-28

Catalyst compositions were prepared in the same manner as in Example 23, except that the pH of the impregnation solution, pH 2 in Example 23, was

TABLE 2

| | Group VIB metal | | Group VIII metal | | | | Other components | | | | |
|---|---|---|---|---|---|---|---|---|---|---|---|
| | Compound | Amount (wt %) | Compound | Amount (wt %) | Compound | Amount (wt %) | Compound | Amount (wt %) | $h_2/h_1$ | $h_4/h_3$ | Specific surface area (m²/g) |
| Example | | | | | | | | | | | |
| 12 | MoO₃ | 20.5 | NiO | 2.5 | CoO | 2.5 | B₂O₃ | 0.21 | 0.57 | 0.60 | 210 |
| 13 | MoO₃ | 19.7 | NiO | 2.5 | CoO | 2.5 | B₂O₃ | 0.36 | 0.62 | 0.62 | 211 |
| 14 | MoO₃ | 18.9 | NiO | 2.5 | CoO | 2.5 | B₂O₃ | 0.57 | 0.68 | 0.69 | 215 |
| 15 | MoO₃ | 19.1 | NiO | 2.5 | CoO | 2.5 | B₂O₃ | 1.20 | 0.76 | 0.77 | 208 |
| 16 | MoO₃ | 16.5 | NiO | 2.5 | CoO | 2.5 | B₂O₃ | 2.22 | 0.63 | 0.64 | 210 |
| 17 | MoO₃ | 15.8 | NiO | 2.5 | CoO | 2.5 | B₂O₃ | 4.56 | 0.75 | 0.74 | 210 |
| 18 | MoO₃ | 20.5 | NiO | 2.5 | CoO | 2.5 | B₂O₃ | 0.15 | 0.55 | 0.55 | 180 |
| 19 | MoO₃ | 18.5 | NiO | 2.5 | CoO | 2.5 | TiO₂ | 6.51 | 0.64 | 0.65 | 214 |
| 20 | MoO₃ | 17.4 | NiO | 2.5 | CoO | 2.5 | ZnO | 5.57 | 0.59 | 0.58 | 231 |
| 21 | WO₃ | 17.2 | NiO | 2.5 | CoO | 2.5 | B₂O₃ | 0.22 | 0.57 | 0.60 | 210 |
| 22 | CrO₃ | 15.8 | NiO | 2.5 | CoO | 2.5 | B₂O₃ | 0.19 | 0.57 | 0.60 | 206 |
| Comparative Example | | | | | | | | | | | |
| 5 | MoO₃ | 19.4 | NiO | 2.5 | CoO | 2.5 | B₂O₃ | 8.0 | 1.00 | 1.00 | 248 |
| 6 | MoO₃ | 16.1 | NiO | 2.5 | CoO | 2.5 | B₂O₃ | 9.3 | 1.00 | 1.00 | 232 |
| 7 | MoO₃ | 16.1 | NiO | 2.5 | CoO | 2.5 | TiO₂ | 9.1 | 1.00 | 1.00 | 218 |
| 8 | MoO₃ | 15.9 | NiO | 2.5 | CoO | 2.5 | ZnO | 8.8 | 1.00 | 1.00 | 220 |

Preparation of Catalyst Compositions According to the Third Invention

Example 23

1,000 cc of distilled water charged into a 2,000 cc beaker and warmed to 60° C. Then, 150 g of carrier, a 9:1 mixture of Gamma-alumina and boria, in the form of cylinders with a diameter of 1.6 mm (1/16") and a length of 2-3 mm, was added. The mixture was adjusted to pH 2 by the addition of concentrated nitric acid and stirred. After 24 hours, the liquid was removed by filtration and the solid was promptly dried at 120° C.

In order to support molybdenum onto the carrier, 100 g of the pretreated carrier was immersed into an impregnation solution comprising 15 cc of aqueous concentrated ammonia solution and 23.0 g of ammonium paramolybdate dissolved in 85 cc of distilled water, followed by calcination at 500° C. 100 g of the carrier onto which molybdenum was supported was immersed into an impregnation solution comprising 9.4 g of nickel nitrate hexahydrate and 9.4 g of cobalt nitrate hexahydrate completely dissolved in 100 cc of distilled water changed to pH 3 for Example 27 and pH 4 for Example 28.

Figure 24:
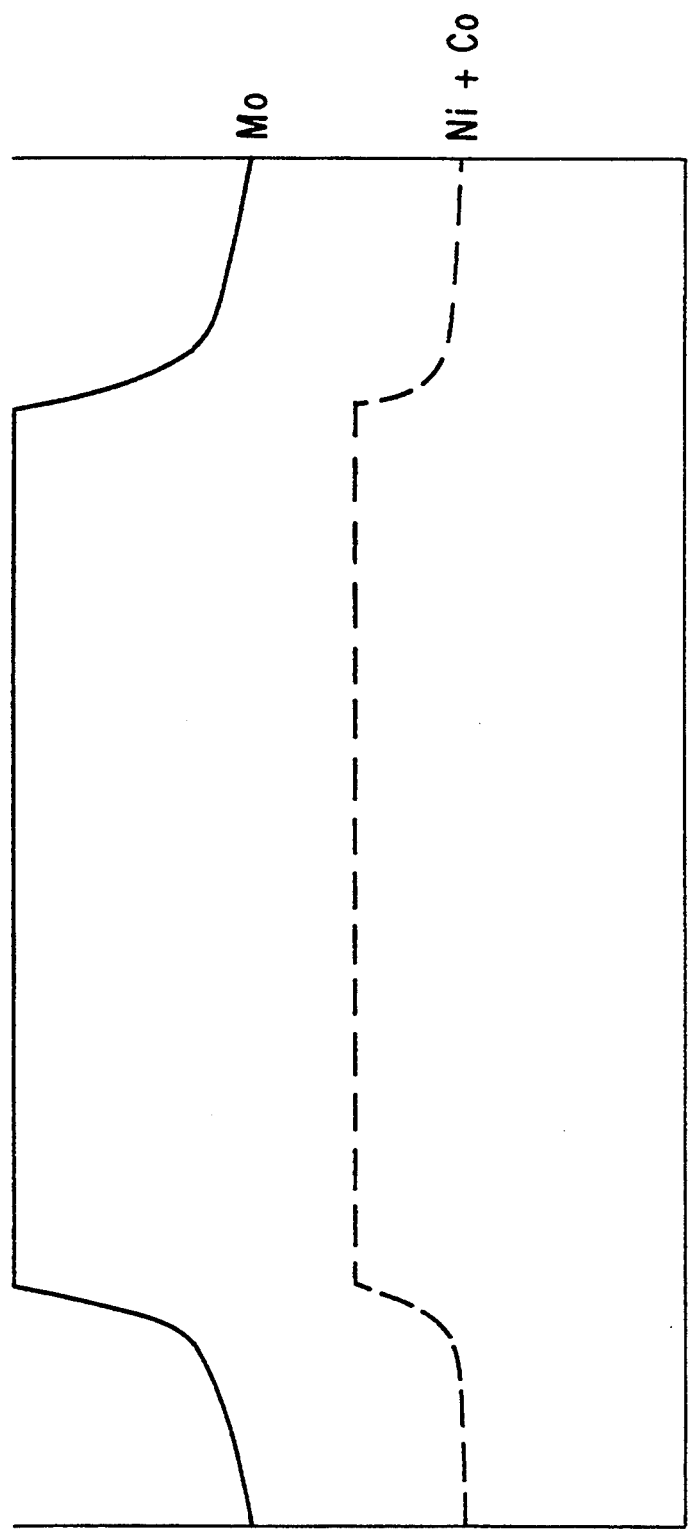
Figure 25:
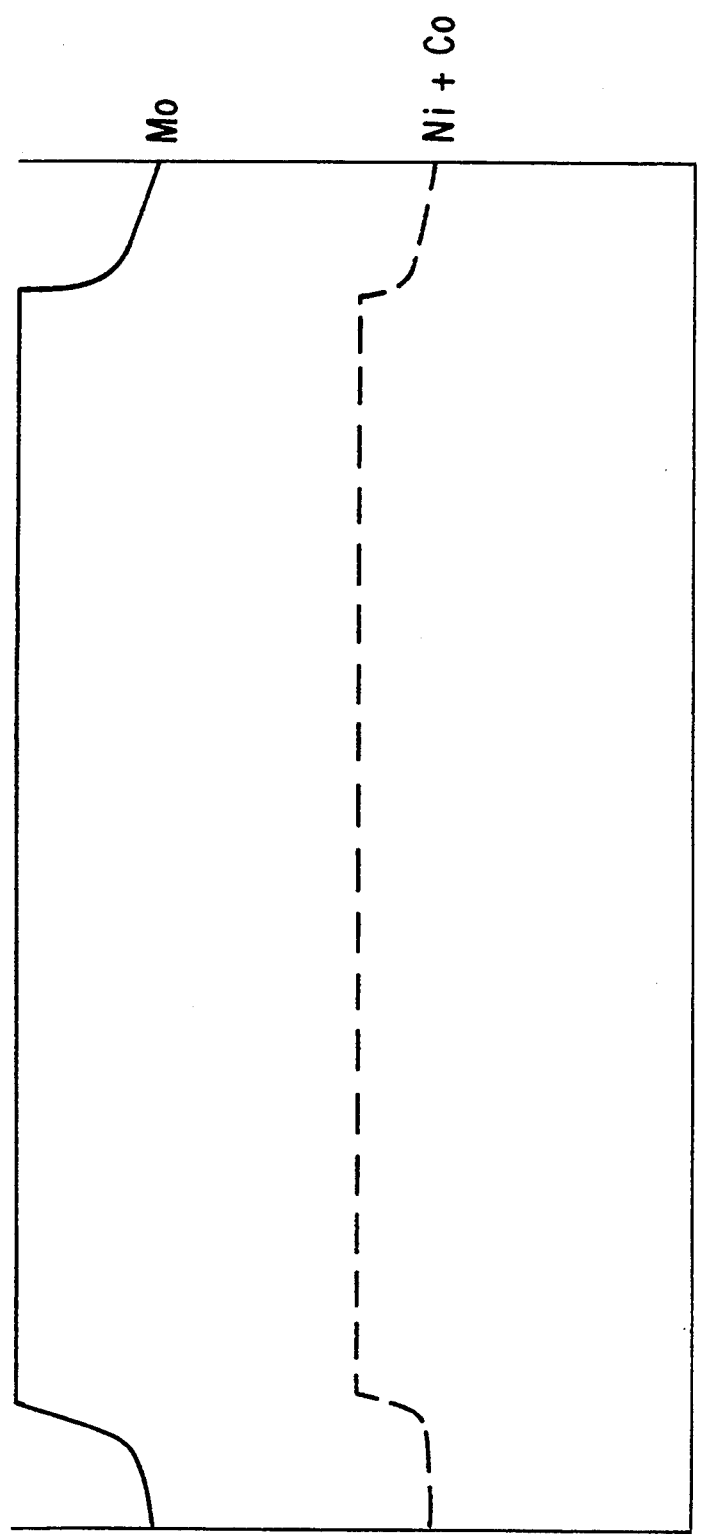

The composition, physical properties, $h_2/h_1$, and $h_4/h_3$ of the resulting catalyst compositions are listed in Table 3. The results of the EPMA analysis are shown in FIG. 24 (Example 27) and FIG. 25 (Example 28).

Example 29

A catalyst composition was prepared in the same manner as in Example 23, except that the temperature of the impregnation solution was 80° C. instead of 60° C. in Example 23.

Figure 26:
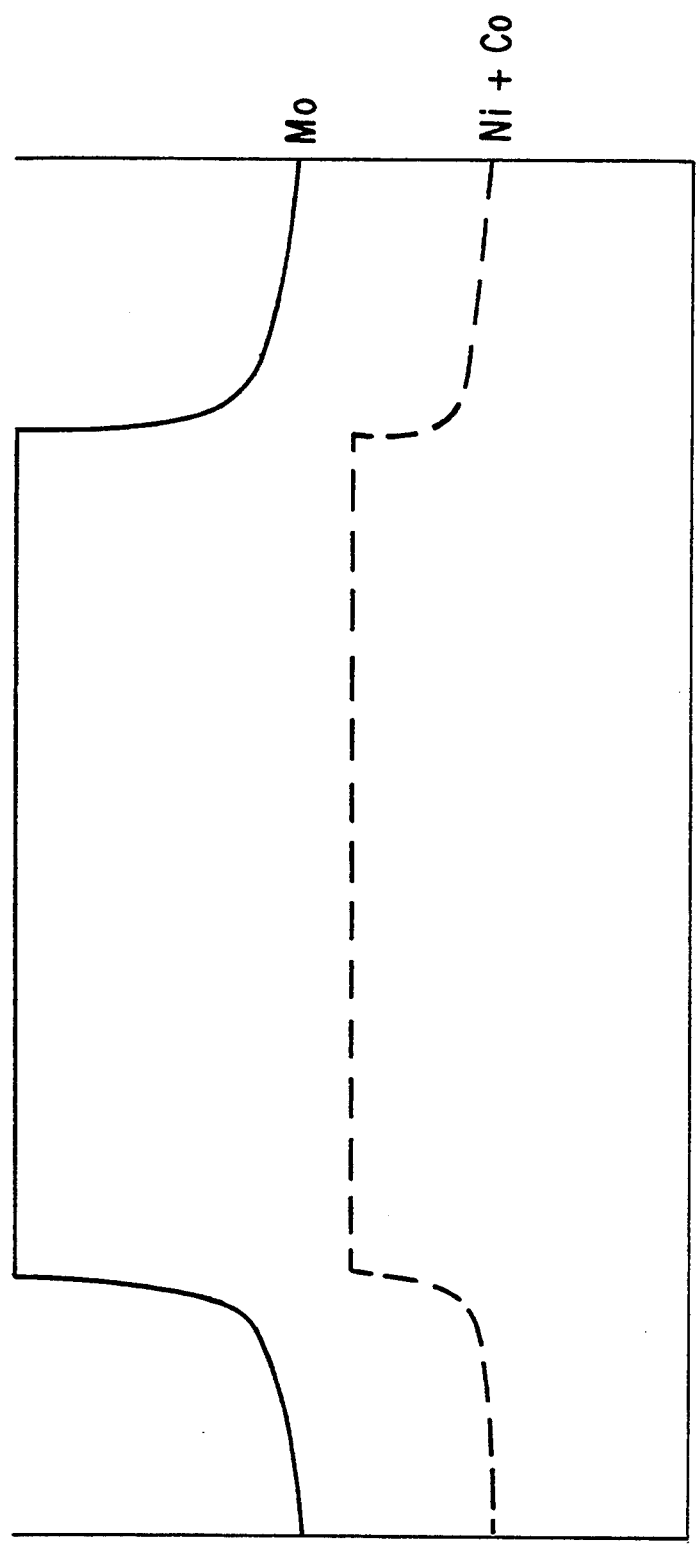

The composition, physical properties, $h_2/h_1$, and $h_4/h_3$ of the resulting catalyst composition are listed in Table 3. The results of the EPMA analysis are shown in FIG. 26.

Example 30

A catalyst composition was prepared in the same manner as in Example 23, except that a 9:1 mixture of Gamma-alumina and titania was used as a carrier instead of the 9:1 mixture of Gamma-alumina and boria in Example 23.

Figure 27:
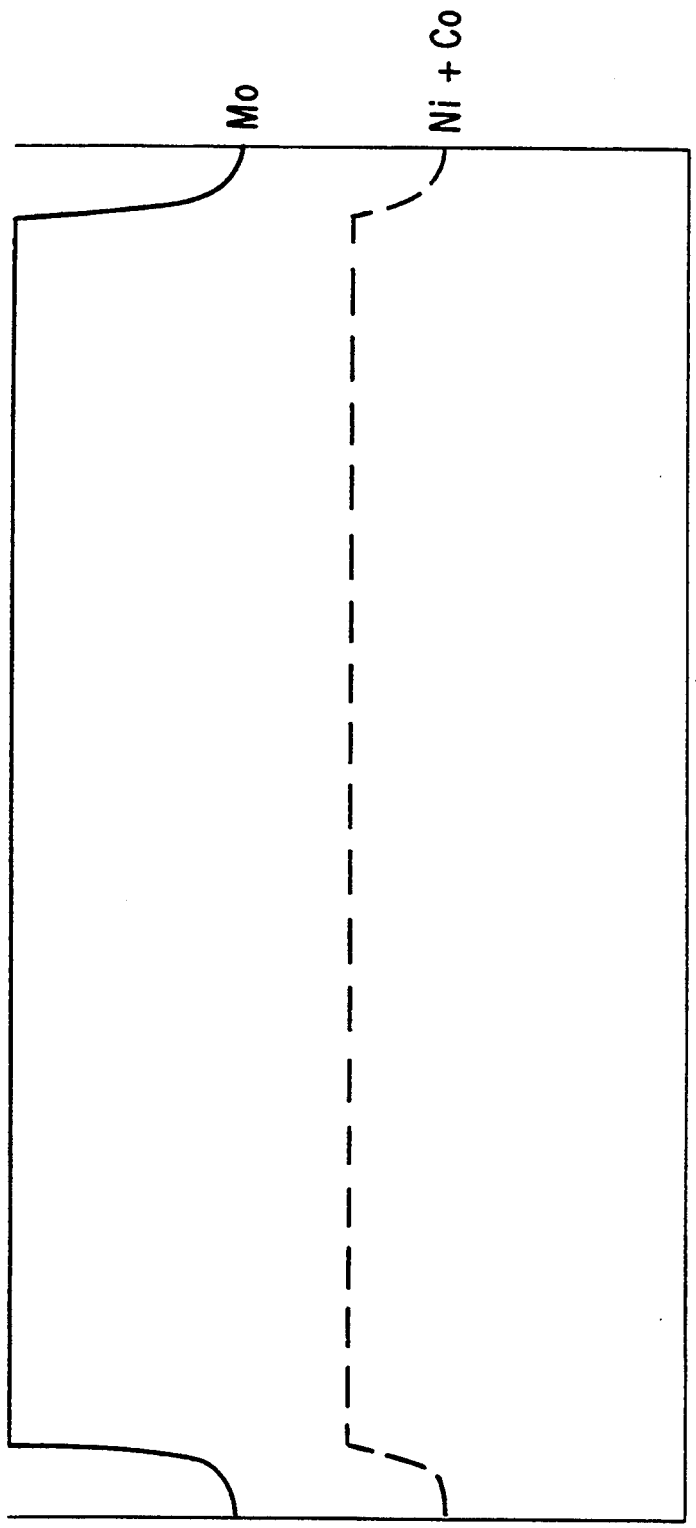

The composition, physical properties, $h_2/h_1$, and $h_4/h_3$ of the resulting catalyst composition are listed in Table 3. The results of the EPMA analysis are shown in FIG. 27.

Example 31

A catalyst composition was prepared in the same manner as in Example 23, except that a 9:1 mixture of Gamma-alumina and zinc oxide was used as a carrier instead of the 9:1 mixture of Gamma-alumina and boria in Example 23.

Figure 28:
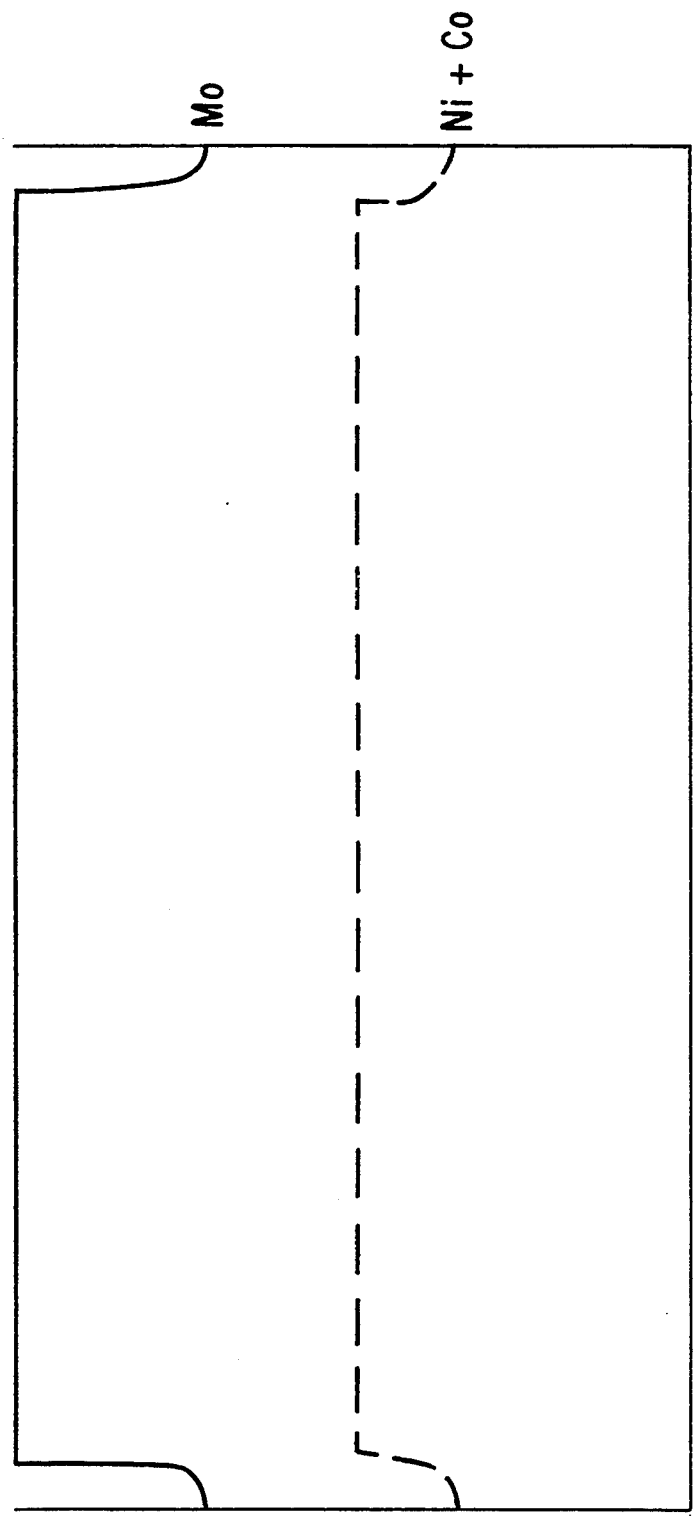

The composition, physical properties, $h_2/h_1$, and $h_4/h_3$ of the resulting catalyst composition are listed in Table 3. The results of the EPMA analysis are shown in FIG. 28.

carrier instead of the 9:1 mixture of Gamma-alumina and boria in Comparative Example 9.

The composition, physical properties, $h_2/h_1$, and $h_4/h_3$ of the resulting catalyst composition are listed in Table 3.

Comparative Example 11

A catalyst composition was prepared in the same manner as in Comparative Example 5, except that a 9:1 mixture of Gamma-alumina and zinc oxide was used as a carrier instead of the 9:1 mixture of Gamma-alumina and boria in Comparative Example 9.

The composition, physical properties, $h_2/h_1$, and $h_4/h_3$ of the resulting catalyst composition are listed in Table 3.

TABLE 3

|  | Group VIB metal | | Group VIII metal | | | | Other Components | | | | Specific surface area (m²/g) |
|---|---|---|---|---|---|---|---|---|---|---|---|
|  | Compound | Amount (wt %) | Compound | Amount (wt %) | Compound | Amount (wt %) | Compound | Amount (wt %) | $h_2/h_1$ | $h_4/h_3$ | |
| Example | | | | | | | | | | | |
| 23 | MoO₃ | 15.8 | NiO | 2.5 | CoO | 2.5 | B₂O₃ | 0.25 | 0.59 | 0.61 | 208 |
| 24 | MoO₃ | 16.2 | NiO | 2.5 | CoO | 2.5 | B₂O₃ | 0.41 | 0.64 | 0.65 | 212 |
| 25 | MoO₃ | 15.9 | NiO | 2.5 | CoO | 2.5 | B₂O₃ | 0.63 | 0.71 | 0.71 | 222 |
| 26 | MoO₃ | 15.6 | NiO | 2.5 | CoO | 2.5 | B₂O₃ | 1.22 | 0.80 | 0.81 | 218 |
| 27 | MoO₃ | 16.5 | NiO | 2.5 | CoO | 2.5 | B₂O₃ | 2.23 | 0.65 | 0.68 | 219 |
| 28 | MoO₃ | 15.8 | NiO | 2.4 | CoO | 2.5 | B₂O₃ | 5.11 | 0.79 | 0.77 | 221 |
| 29 | MoO₃ | 15.8 | NiO | 2.5 | CoO | 2.5 | B₂O₃ | 0.18 | 0.58 | 0.58 | 184 |
| 30 | MoO₃ | 15.5 | NiO | 2.5 | CoO | 2.4 | TiO₂ | 6.33 | 0.67 | 0.71 | 224 |
| 31 | MoO₃ | 16.4 | NiO | 2.5 | CoO | 2.5 | ZnO | 5.19 | 0.71 | 0.70 | 237 |
| 32 | WO₃ | 17.3 | NiO | 2.5 | CoO | 2.4 | B₂O₃ | 0.25 | 0.59 | 0.61 | 214 |
| 33 | CrO₃ | 15.8 | NiO | 2.5 | CoO | 2.5 | B₂O₃ | 0.25 | 0.60 | 0.60 | 210 |
| Comparative Example | | | | | | | | | | | |
| 9 | MoO₃ | 15.9 | NiO | 2.5 | CoO | 2.5 | B₂O₃ | 8.0 | 1.00 | 1.00 | 248 |
| 10 | MoO₃ | 16.1 | NiO | 2.5 | CoO | 2.5 | TiO₂ | 9.1 | 1.00 | 1.00 | 218 |
| 11 | MoO₃ | 15.9 | NiO | 2.5 | CoO | 2.5 | ZnO | 8.8 | 1.00 | 1.00 | 220 |

Examples 32–33

Catalyst compositions were prepared in the same manner as in Example 23, except that 20.2 g of tungstic acid (Example 32) or 23.6 g of ammonium dichromate (Example 33) was used instead of 23.5 g of ammonium paramolybdate tetrahydrate of Example 23.

The composition, physical properties, $h_2/h_1$, and $h_4/h_3$ of the resulting catalyst compositions are listed in Table 3.

Comparative Example 9

100 g of a 9:1 mixture of Gamma-alumina and boria was immersed into an impregnation solution prepared by dissolving 15 cc of aqueous concentrated ammonia solution and 23.0 g of ammonium paramolybdate in 85 cc of distilled water, and calcined at 500° C. to support Mo onto the carrier. The carrier was then immersed into an impregnation solution of 9.4 g of nickel nitrate hexahydrate and 9.4 g of cobalt nitrate hexahydrate completely dissolved into 100 cc of distilled water, followed by calcination at 500° C. to support Ni and Co onto the carrier.

The composition, physical properties, $h_2/h_1$, and $h_4/h_3$ of the resulting catalyst composition are listed in Table 3.

Comparative Example 10

A catalyst composition was prepared in the same manner as in Comparative Example 9, except that a 9:1 mixture of Gamma-alumina and titania was used as a carrier instead of the 9:1 mixture of Gamma-alumina and boria in Comparative Example 9.

Evaluation of Catalyst Compositions

Relative activities in terms of hydrodesulfurization and hydrodemetalization of catalyst compositions prepared in Examples and Comparative Examples were evaluated under the following conditions. The results are shown in Table 4.

| Feed oil: Iranian Heavy Topping residue | |
|---|---|
| Sulfur content (wt %) | 3.24 |
| Vanadium content (ppm) | 119 |
| Nickel content (ppm) | 39 |
| Test conditions: | |
| Reaction temperature (°C.) | 390 |
| Reaction pressure (Kg/cm² · G) | 105 |
| LHSV (hr⁻¹) | 1.0 |
| H₂/Feed oil (Nl/l) | 1068 |
| (scf/bbl) | 6000 |
| Apparatus: A fixed bed, high pressure flow-type apparatus | |

Evaluation method:

Residual sulfur content (wt %), vanadium content (ppm), and nickel content (ppm) on the 20th and 90th day of operation under the above conditions were measured.

Relative desulfurization activities were determined by the following equations.

Relative desulfurization activity after 90 days $$= (K_{90}/Kr_{90}) \times 100$$

wherein, $K_{90}$ is the relative activity of a catalyst composition of the present invention, and $Kr_{90}$ is the relative activity of a comparative catalyst composition, each determined by the following equations.

$$K_{90} = LHSV \times \left[\frac{1}{\text{Residual } S \text{ on 90th day (wt \%)}} - \frac{1}{S \text{ in feed (wt \%)}}\right]$$

$$Kr_{90} = LHSV \times \left[\frac{1}{\text{Residual } S \text{ on 90th day (wt \%)}} - \frac{1}{S \text{ in feed (wt \%)}}\right]$$

Relative desulfurization activity after 20 days, $(K_{20}/Kr_{20}) \times 100$, was also determined in the same manner.

Relative demetalization activities were determined in the same manner as in the determination of the relative desulfurization activities, except that the amount of sulfur (S) in the above formulas were replaced by the total amount of nickel and vanadium.

TABLE 4

| Test No. | Catalyst used | Relative activity of desulfurization 20 Days | Relative activity of desulfurization 90 Days | Relative activity of demetalization 20 Days | Relative activity of demetalization 90 Days |
|---|---|---|---|---|---|
| 1 | Example 1 | 100 | 120 | 105 | 125 |
| 2 | Example 2 | 100 | 117 | 103 | 120 |
| 3 | Example 3 | 100 | 112 | 100 | 113 |
| 4 | Example 4 | 100 | 108 | 100 | 109 |
| 5 | Comparative Example 1 | 100 | 100 | 100 | 100 |
| 6 | Example 5 | 100 | 112 | 101 | 118 |
| 7 | Example 6 | 100 | 108 | 100 | 112 |
| 8 | Comparative Example 2 | 100 | 100 | 100 | 100 |
| 9 | Example 8 | 100 | 125 | 105 | 127 |
| 10 | Comparative Example 3 | 100 | 100 | 100 | 100 |
| 11 | Example 9 | 100 | 120 | 100 | 125 |
| 12 | Comparative Example 4 | 100 | 100 | 100 | 100 |
| 13 | Example 12 | 100 | 121 | 105 | 127 |
| 14 | Example 13 | 100 | 118 | 103 | 121 |
| 15 | Example 14 | 100 | 112 | 100 | 114 |
| 16 | Example 15 | 100 | 107 | 100 | 109 |
| 17 | Comparative Example 5 | 100 | 100 | 100 | 100 |
| 18 | Example 16 | 100 | 106 | 101 | 110 |
| 19 | Example 17 | 100 | 103 | 100 | 106 |
| 20 | Comparative Example 6 | 100 | 100 | 100 | 100 |
| 21 | Example 19 | 100 | 125 | 101 | 127 |
| 22 | Comparative Example 7 | 100 | 100 | 100 | 100 |
| 23 | Example 20 | 100 | 118 | 100 | 122 |
| 24 | Comparative Example 8 | 100 | 100 | 100 | 100 |
| 25 | Example 23 | 100 | 119 | 105 | 124 |
| 26 | Example 24 | 100 | 115 | 103 | 118 |
| 27 | Example 25 | 100 | 112 | 100 | 113 |
| 28 | Example 26 | 100 | 109 | 100 | 108 |
| 29 | Example 27 | 100 | 104 | 101 | 108 |
| 30 | Example 28 | 100 | 101 | 100 | 104 |
| 31 | Comparative Example 9 | 100 | 100 | 100 | 100 |
| 32 | Example 30 | 100 | 114 | 101 | 118 |
| 33 | Comparative Example 10 | 100 | 100 | 100 | 100 |
| 34 | Example 31 | 100 | 115 | 100 | 118 |
| 35 | Comparative Example 11 | 100 | 100 | 100 | 100 |

Obviously, numerous modifications and variations of the present invention are possible in light of the above teachings. It is therefore to be understood that within the scope of the appended claims, the invention may be practiced otherwise than as specifically described herein.

What is claimed is:

1. A catalyst composition for hydrotreating of hydrocarbon oils which comprises a Group VIB metal in an amount of 5–30% by weight, as oxide, and a Group VIII metal in an amount of 1–10% by weight, as oxide, wherein said Group VIB metal and said Group VIII metal are impregnated into an alumina carrier and are distributed in a catalyst particle with a concentration gradient which becomes higher from the surface toward the center of the catalyst particle according to the formulas, $0.9 > h_2/h_1 \geq 0$, wherein $h_1$ is the Group VIB metal concentration at the center of the catalyst particle and $h_2$ is the Group VIB metal concentration at the outermost surface of the catalyst particle, and $0.9 > h_4/h_3 \geq 0$, wherein $h_3$ is the Group VIII metal concentration at the center of the catalyst particle and $h_4$ is the Group VIII metal concentration at the outermost surface of the catalyst particle, wherein in the catalyst particle starting from a first outside surface through the center and to a second outside surface which is opposite to the first outside surface, the Group VIB metal and the Group VIII metal each have a concentration distribution as shown in FIG. 2.

2. The catalyst composition according to claim 1, wherein said Group VIB metal and said Group VIII metal are distributed in the catalyst particles with a concentration gradient according to the formula, $0.76 > h_2/h_1 \geq 0$, wherein $h_1$ is the Group VIB metal concentration at the center and $h_2$ at the outermost surface of the catalyst particle, and said Group VIII metal, $0.71 > h_4/h_3 \geq 0$, wherein $h_3$ is the Group VIII metal concentration at the center and $h_4$ at the outermost surface.

3. The catalyst composition according to claim 1, wherein said Group VIB metal is one or more metals selected from the group consisting of chromium, molybdenum, and tungsten.

4. The catalyst composition according to claim 1, wherein said Group VIB metal is molybdenum.

5. The catalyst composition according to claim 1, wherein the amount of said Group VIB metal is 7–25% by weight, as oxide.

6. The catalyst composition according to claim 1, wherein the amount of said Group VIB metal is 10–20% by weight, as oxide.

7. The catalyst composition according to claim 1, wherein said Group VIII metal is one or more metals selected from the group consisting of iron, cobalt, nickel, ruthenium, rhodium, palladium, iridium, and platinum.

8. The catalyst composition according to claim 1, wherein said Group VIII metal is at least one metal selected from the group consisting of nickel, cobalt and mixtures thereof.

9. The catalyst composition according to claim 1, wherein the amount of said Group VIII metal is 2–8% by weight, as oxide.

10. A process for manufacturing a catalyst composition consisting essentially of:
providing an aqueous solution of pH 2–4 containing one or more Group VIB metals and an alumina carrier containing 5–40% by weight of at least one component selected from the group consisting of silica, zeolite, boria, titania, and zinc oxide, and impregnating said carrier with said one or more Group VIB metals by a method consisting essentially of impregnating said one or more Group VIB metals into said alumina carrier by immersing said alumina carrier into said aqueous solution at a temperature from 45° C. to the boiling point of said aqueous solution for at least 60 minutes, and impregnating one or more Group VIII metals into said alumina carrier by immersing said alumina carrier into an aqueous solution of the one or more Group VIII metals, wherein the catalyst composition comprises a Group VIB metal in an amount of 5–30% by weight, as oxide, and a Group VIII metal in an amount of 1–10% by weight, as oxide, wherein said Group VIB metal and said Group VIII metal are distributed with a concentration gradient which becomes higher from the surface toward the center of a catalyst particle according to the formulas, $0.9 > h_2/h_1 \geq 0$, wherein $h_1$ is the Group VIB metal concentration at the center of the catalyst particle and $h_2$ is the Group VIB metal concentration at the outermost surface of the catalyst particle, and $0.9 > h_4/h_3 \geq 0$, wherein $h_3$ is the Group VIII metal concentration at the center of the catalyst particle and $h_4$ is the Group VIII metal concentration at the outermost surface of the catalyst particle.

11. The process according to claim 10, wherein said Group VIB metal is molybdenum.

12. The process according to claim 10, wherein said Group VIII metal is at least one metal selected from the group consisting of nickel, cobalt and mixtures thereof.

13. The process according to claim 10, wherein the temperature of said aqueous solution of one or more Group VIB metals is between 50°–80° C.

14. The process according to claim 10, wherein said alumina carrier is immersed into said aqueous solution for at least 80 minutes.

15. The process according to claim 10, wherein said carrier is an alumina comprising boria.

16. The process according to claim 10, wherein said Group VIB metal is impregnated into said carrier before said Group VIII metal is impregnated into said carrier.

17. A process for manufacturing a catalyst composition consisting essentially of:

immersing an alumina carrier containing 5–40% by weight of at least one component selected from the group consisting of boria, titania, and zinc oxide into an aqueous solution of pH 2–4 at a temperature from 45° C. to the boiling point of said aqueous solution for at least 60 minutes, and impregnating one or more Group VIB metals and one or more Group VIII metals into said alumina carrier by immersing the alumina carrier into an aqueous solution containing the one or more Group VIB metals and an aqueous solution containing the one or more Group VIII metals, wherein the catalyst composition comprises a Group VIB metal in an amount of 5–30% by weight, as oxide, and a Group VIII metal in an amount of 1–10% by weight, as oxide, wherein said Group VIB metal and said Group VIII metal are distributed with a concentration gradient which becomes higher from the surface toward the center of a catalyst particle according to the formulas, $0.9 > h_2/h_1 \geq 0$, wherein $h_1$ is the Group VIB metal concentration at the center of the catalyst particle and $h_2$ is the Group VIB metal concentration at the outermost surface of the catalyst particle, and $0.9 > h_4/h_3 \geq 0$, wherein $h_3$ is the Group VIII metal concentration at the center of the catalyst particle and $h_4$ is the Group VIII metal concentration at the outermost surface of the catalyst particle.

18. The process according to claim 17, wherein said Group VIB metal is molybdenum.

19. The process according to claim 17, wherein said Group VIII metal is at least one metal selected from the group consisting of nickel, cobalt and mixtures thereof.

20. The process according to claim 17, wherein the temperature of said aqueous solution of pH 2–4 is between 50°–80° C.

21. The process according to claim 17, wherein said alumina carrier is immersed into said aqueous solution in said impregnating step for at least 80 minutes.

22. The process according to claim 17, wherein said carrier is an alumina comprising boria.

23. The catalyst composition according to claim 1, wherein said catalyst particle has a side crush strength of from about 0.8 to about 3.5 kg/mm.

* * * * *